United States Patent
Zhou et al.

(10) Patent No.: US 11,889,545 B2
(45) Date of Patent: Jan. 30, 2024

(54) DOWNLINK RECEPTION ASSUMPTION PRIORITIZATION BASED ON DOWNLINK PHYSICAL LAYER (PHY) PRIORITY

(71) Applicant: QUALCOMM Incorporated, San Diego, CA (US)

(72) Inventors: Yan Zhou, San Diego, CA (US); Tao Luo, San Diego, CA (US); Peter Gaal, San Diego, CA (US); Mostafa Khoshnevisan, San Diego, CA (US); Seyed Ali Akbar Fakoorian, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/128,647

(22) Filed: Dec. 21, 2020

(65) Prior Publication Data
US 2021/0314964 A1    Oct. 7, 2021

Related U.S. Application Data

(60) Provisional application No. 63/004,083, filed on Apr. 2, 2020.

(51) Int. Cl.
*H04W 72/56* (2023.01)
*H04W 72/23* (2023.01)

(52) U.S. Cl.
CPC .......... *H04W 72/56* (2023.01); *H04W 72/23* (2023.01)

(58) Field of Classification Search
CPC .............. H04W 72/042; H04W 72/10; H04W 72/1289; H04W 52/146; H04W 52/18
See application file for complete search history.

(56) References Cited

U.S. PATENT DOCUMENTS

| | | | |
|---|---|---|---|
| 2019/0037577 A1* | 1/2019 | Sun | H04L 41/0866 |
| 2019/0044639 A1* | 2/2019 | Ouchi | H04W 52/18 |
| 2019/0253904 A1 | 8/2019 | Tsai et al. | |
| 2020/0045569 A1* | 2/2020 | Seo | H04L 5/0053 |
| 2020/0221485 A1* | 7/2020 | Cirik | H04L 5/10 |
| 2020/0267712 A1* | 8/2020 | Cirik | H04B 7/0695 |
| 2020/0296673 A1* | 9/2020 | Ouchi | H04W 52/281 |
| 2020/0396759 A1* | 12/2020 | Baldemair | H04W 76/11 |
| 2021/0068105 A1* | 3/2021 | Fakoorian | H04W 72/042 |
| 2021/0160893 A1* | 5/2021 | Gao | H04L 5/14 |
| 2021/0266934 A1* | 8/2021 | Deghel | H04W 72/02 |
| 2022/0124768 A1* | 4/2022 | Frenne | H04L 5/0048 |
| 2022/0201697 A1* | 6/2022 | Yamamoto | H04W 72/042 |

(Continued)

OTHER PUBLICATIONS

Ericsson: "Scheduling/HARQ Enhancements for NR URLLC", 3GPP Draft, 3GPP TSG-RAN WG1 Meeting #99, R1-1911948, 3rd Generation Partnership Project (3GPP), Mobile Competence Centre, 650, Route Des Lucioles, F-06921 Sophia-Antipolis Cedex, France, vol. RAN WG1, No. Reno, Nevada, Nov. 18, 2019-Nov. 22, 2019, Nov. 9, 2019 (Nov. 9, 2019), XP051823129, 10 Pages.

(Continued)

*Primary Examiner* — Chi Ho A Lee
(74) *Attorney, Agent, or Firm* — Patterson + Sheridan, LLP

(57) ABSTRACT

Aspects of the present disclosure relate to wireless communications, and more particularly, to techniques for determining reference assumption, such as quasi co-location (QCL) assumption, prioritization based on downlink physical layer (PHY) priority.

9 Claims, 16 Drawing Sheets

(56) References Cited

U.S. PATENT DOCUMENTS

2022/0217647 A1* 7/2022 Matsumura ......... H04W 52/146
2022/0287030 A1* 9/2022 Ling ................. H04W 72/1289

OTHER PUBLICATIONS

Intel Corporation: "Summary of Multiplexing of Physical Channels and Rs," 3GPP Draft, 3GPP TSG RAN WG1 Meeting #93, R1-1807708, 3rd Generation Partnership Project (3GPP), Mobile Competence Centre, 650, Route Des Lucioles, F-06921, Sophia-Antipolis Cedex, France, vol. RAN WG1. No. Busan, Korea, May 21, 2018-May 25, 2018, May 24, 2018 (May 24, 2018), XP051463337, pp. 1-18, Retrieved from the Internet: URL: http://www.3gpp.org/ftp/tsg%5Fran/WG1%5FRL1/TSGR1%5F93/Docs [retrieved on May 24, 2018], the whole document.
International Search Report and Written Opinion—PCT/US2021/021374—ISA/EPO—dated Jun. 29, 2021.

* cited by examiner

DOWNLINK RECEPTION ASSUMPTION PRIORITIZATION BASED ON DOWNLINK PHYSICAL LAYER (PHY) PRIORITY

CROSS REFERENCE TO RELATED APPLICATION

This Application hereby claims priority under 35 U.S.C. § 119 to U.S. Provisional Patent Application No. 63/004,083, filed on Apr. 2, 2020, the contents of which are incorporated herein in their entirety.

TECHNICAL FIELD

Aspects of the present disclosure relate to wireless communications, and more particularly, to techniques for determining reference assumption, such as quasi co-location (QCL) assumption, prioritization based on downlink physical layer (PHY) priority.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a wireless node. The method generally includes receiving signaling indicating downlink priority levels for downlink transmissions and monitoring occasions; determining, based on one or more rules, a reception assumption to use when at least two of the downlink transmissions and monitoring occasions overlap in time; and processing the at least two of the downlink transmissions and monitoring occasions that overlapped in time based on the reception assumption.

Certain aspects provide a method for wireless communications by a network entity. The method generally includes transmitting, to a wireless node, signaling indicating downlink priority levels for downlink transmissions and monitoring occasions; determining, based on one or more rules, a reception assumption to use if at least two of the downlink transmissions or monitoring occasions overlap in time; and processing the at least two of the downlink transmissions and monitoring occasions based on the reception assumption.

Certain aspects of the present disclosure provide a wireless node. The wireless node generally includes means for receiving signaling indicating downlink priority levels for downlink transmissions and monitoring occasions; means for determining, based on one or more rules, a reception assumption to use when at least two of the downlink transmissions and monitoring occasions overlap in time; and means for processing the at least two of the downlink transmissions and monitoring occasions that overlapped in time based on the reception assumption.

Certain aspects of the present disclosure provide a network entity. The network entity generally includes means for transmitting, to a wireless node, signaling indicating downlink priority levels for downlink transmissions and monitoring occasions; means for determining, based on one or more rules, a reception assumption to use if at least two of the downlink transmissions or monitoring occasions overlap in time; and means for processing the at least two of the downlink transmissions and monitoring occasions based on the reception assumption.

Certain aspects of the present disclosure provide a wireless node. The wireless node generally includes a receiver configured to receive signaling indicating downlink priority levels for downlink transmissions and monitoring occasions; and a processing system configured to determine, based on one or more rules, a reception assumption to use when at least two of the downlink transmissions and monitoring occasions overlap in time and process the at least two of the downlink transmissions and monitoring occasions that overlapped in time based on the reception assumption.

Certain aspects of the present disclosure provide a network entity. The network entity generally includes a transmitter configured to transmit, to a wireless node, signaling indicating downlink priority levels for downlink transmissions and monitoring occasions; and a processing system configured to determine, based on one or more rules, a reception assumption to use if at least two of the downlink transmissions or monitoring occasions overlap in time and process the at least two of the downlink transmissions and monitoring occasions based on the reception assumption.

Certain aspects of the present disclosure provide an apparatus for wireless communications by a wireless node. The apparatus generally includes an interface configured to obtain signaling indicating downlink priority levels for downlink transmissions and monitoring occasions; and a processing system configured to determine, based on one or more rules, a reception assumption to use when at least two of the downlink transmissions and monitoring occasions overlap in time and process the at least two of the downlink transmissions and monitoring occasions that overlapped in time based on the reception assumption.

Certain aspects of the present disclosure provide an apparatus for wireless communications by a network entity. The apparatus generally includes an interface configured to output signaling for transmission to a wireless node, said signaling indicating downlink priority levels for downlink transmissions and monitoring occasions; and a processing system configured to determine, based on one or more rules, a reception assumption to use if at least two of the downlink transmissions or monitoring occasions overlap in time and process the at least two of the downlink transmissions and monitoring occasions based on the reception assumption.

Certain aspects of the present disclosure provide a computer-readable medium for wireless communications. The computer-readable medium generally includes instructions executable to obtain signaling indicating downlink priority levels for downlink transmissions and monitoring occasions; determine, based on one or more rules, a reception assumption to use when at least two of the downlink transmissions and monitoring occasions overlap in time; and process the at least two of the downlink transmissions and monitoring occasions that overlapped in time based on the reception assumption.

Certain aspects of the present disclosure provide a computer-readable medium for wireless communications. The computer-readable medium generally includes instructions executable to output, for transmission to a wireless node, signaling indicating downlink priority levels for downlink transmissions and monitoring occasions; determine, based on one or more rules, a reception assumption to use if at least two of the downlink transmissions or monitoring occasions overlap in time; and process the at least two of the downlink transmissions and monitoring occasions based on the reception assumption.

Aspects of the present disclosure provide wireless nodes, UEs, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
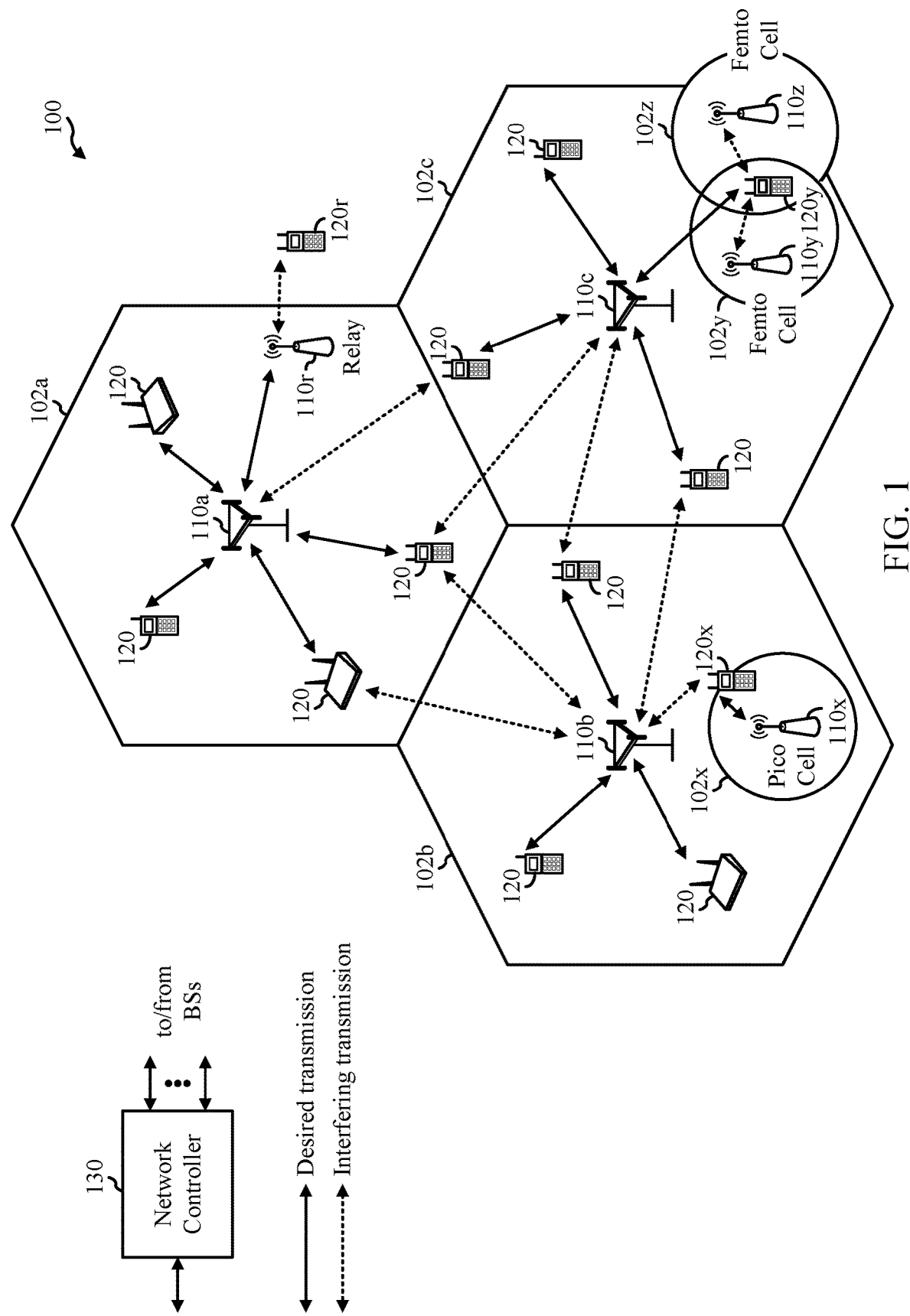
FIG. 1 is a block diagram conceptually illustrating an example telecommunications system, in accordance with certain aspects of the present disclosure.

Aspects of the present disclosure provide apparatus, devices, methods, processing systems, and computer readable mediums for determining downlink reception assumptions in cases where downlink transmissions or monitoring occasions overlap in time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 1000 of FIG. 10 to determine downlink reception assumption prioritization based on downlink physical layer (PHY) priority and/or a BS 110 configured to perform operations 1100 of FIG. 11 to determine downlink reception assumption prioritization based on downlink physical layer (PHY) priority.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
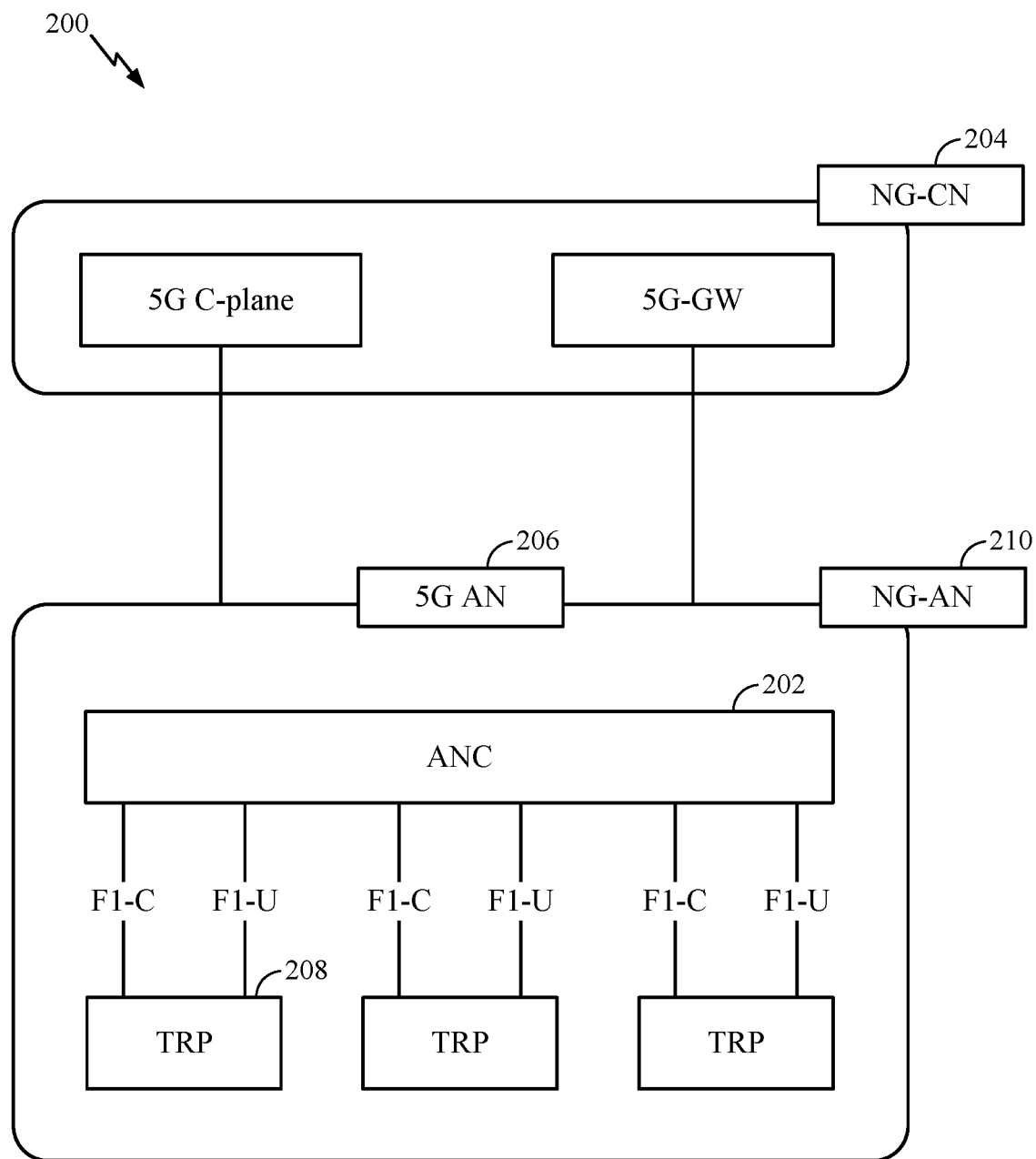
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
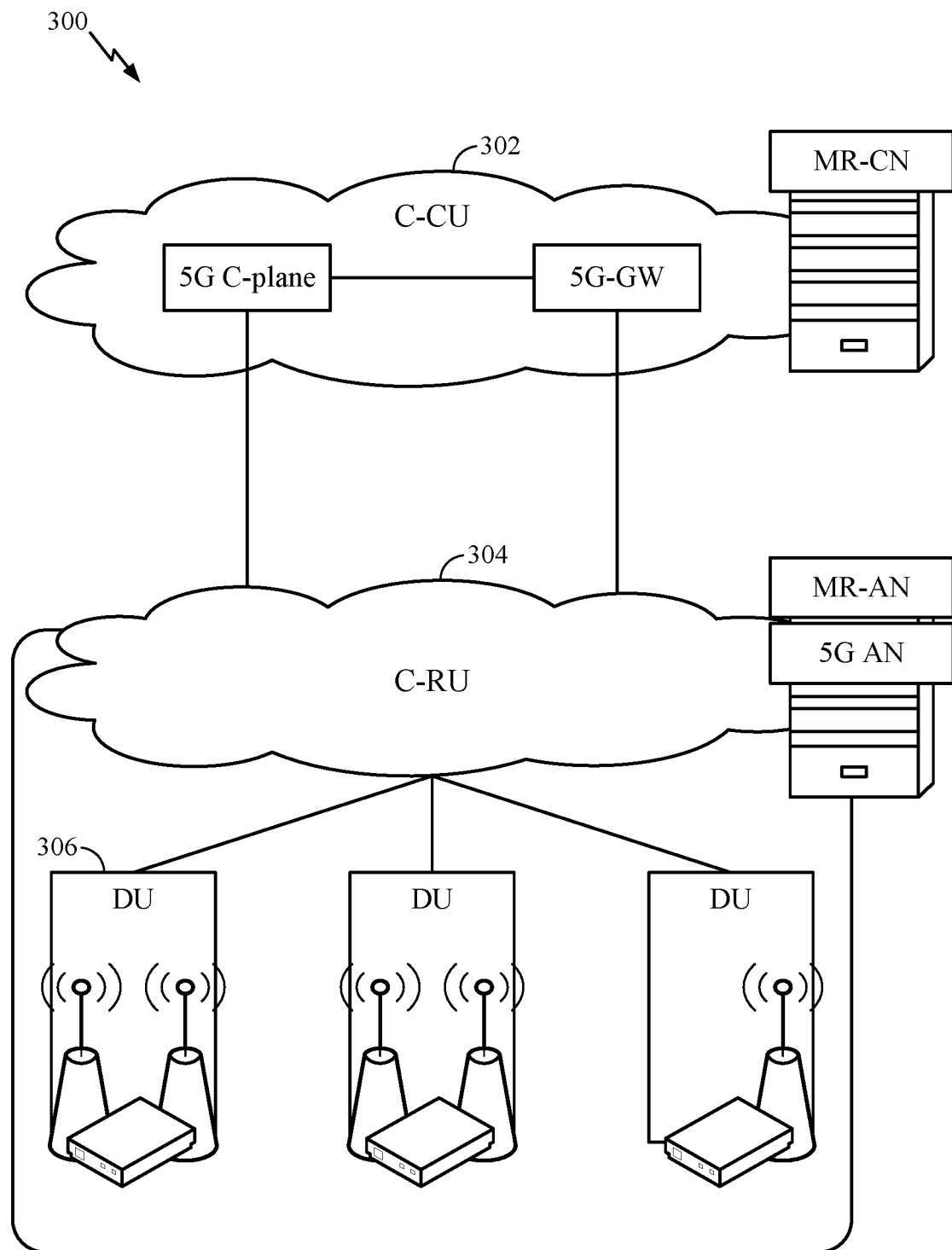
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
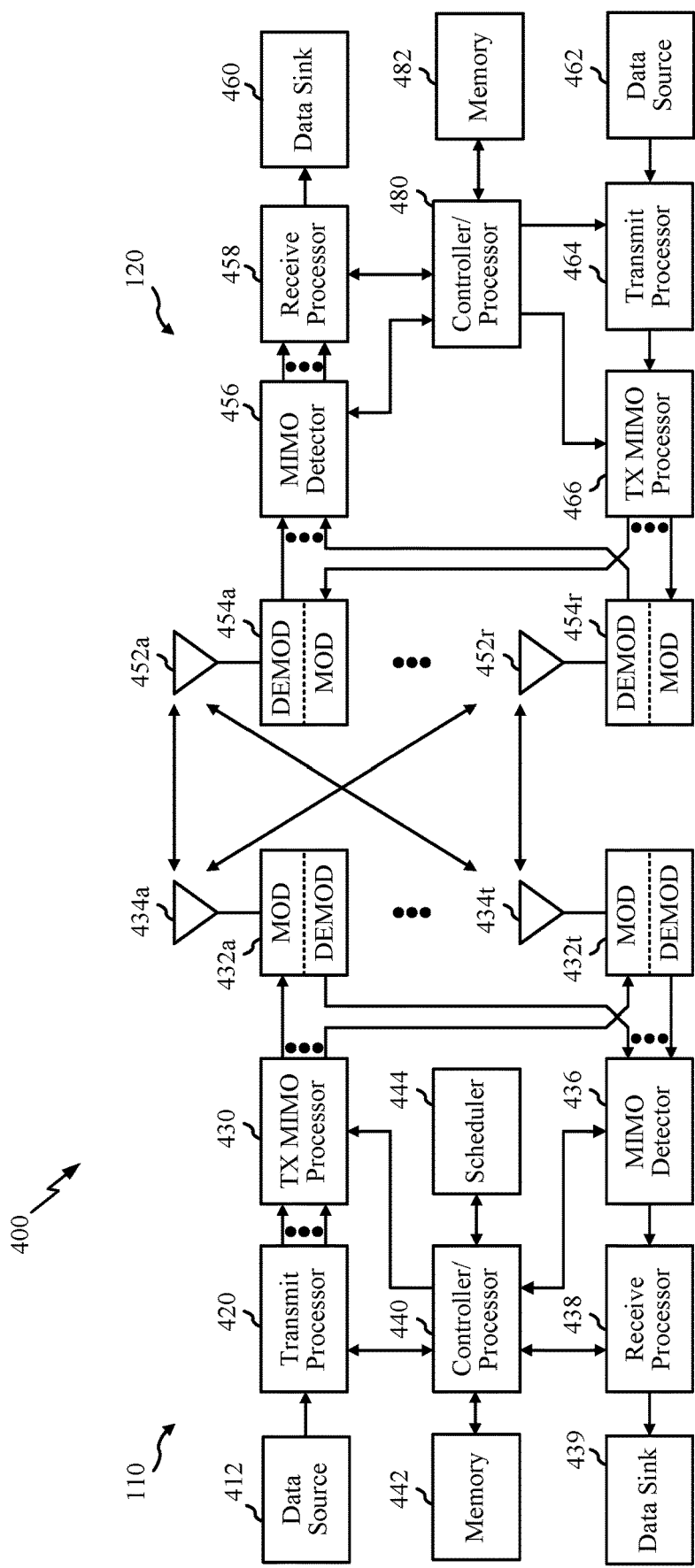
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations 1000 of FIG. 10, while antennas 434, processors 420, 460, 438, and/or controller/processor 440 of the BS 110 may be used to perform operations 1100 of FIG. 11.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, antennas 452a through 452r may receive downlink signals from the base station 110 and may provide received signals to demodulators (DEMODs) in transceivers 454a through 454r, respectively. Each demodulator 454 may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the base station 110 and the UE 120, respectively.

The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the downlink and/or uplink.

Figure 5:
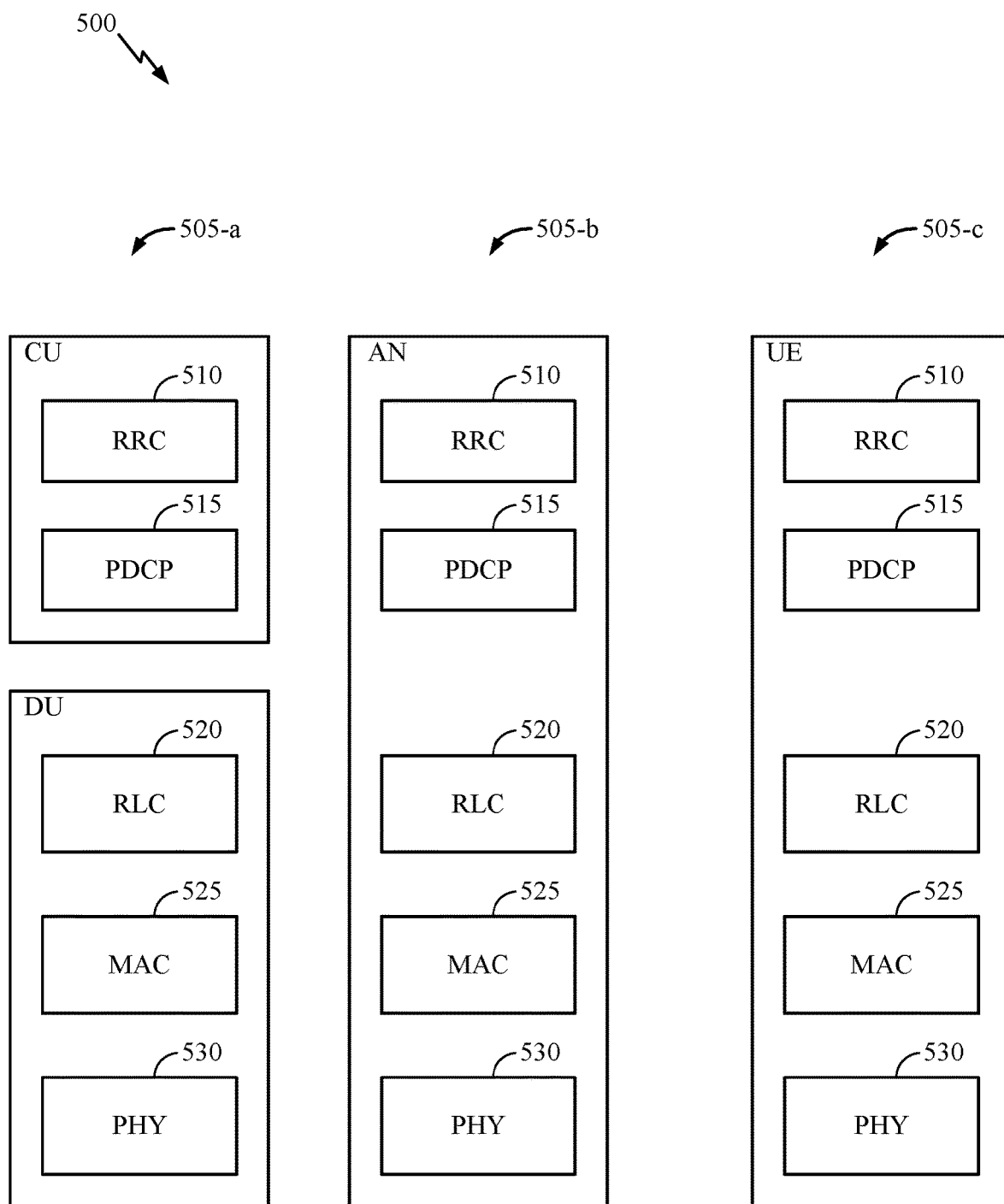
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
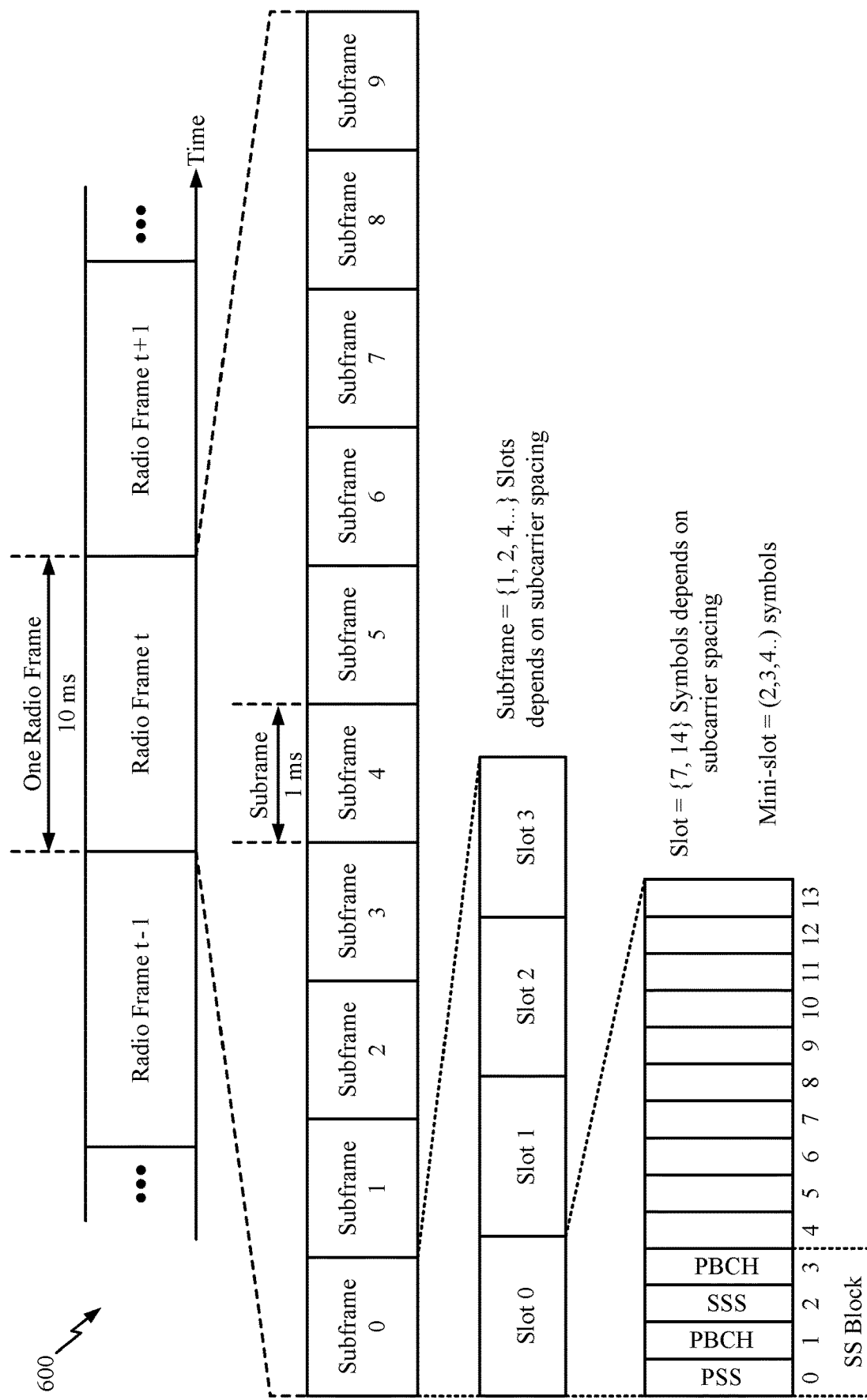
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 7:
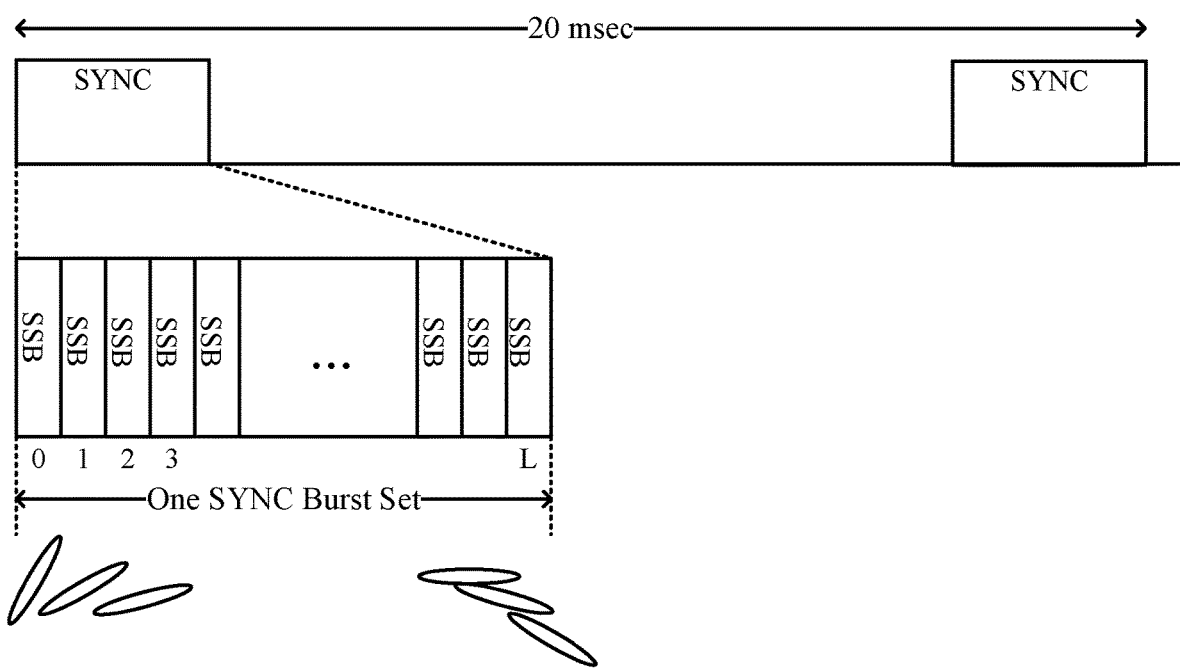
FIG. 7 illustrates how different synchronization signal blocks (SSBs) may be sent using different beams, in accordance with certain aspects of the present disclosure.

As shown in FIG. 7, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
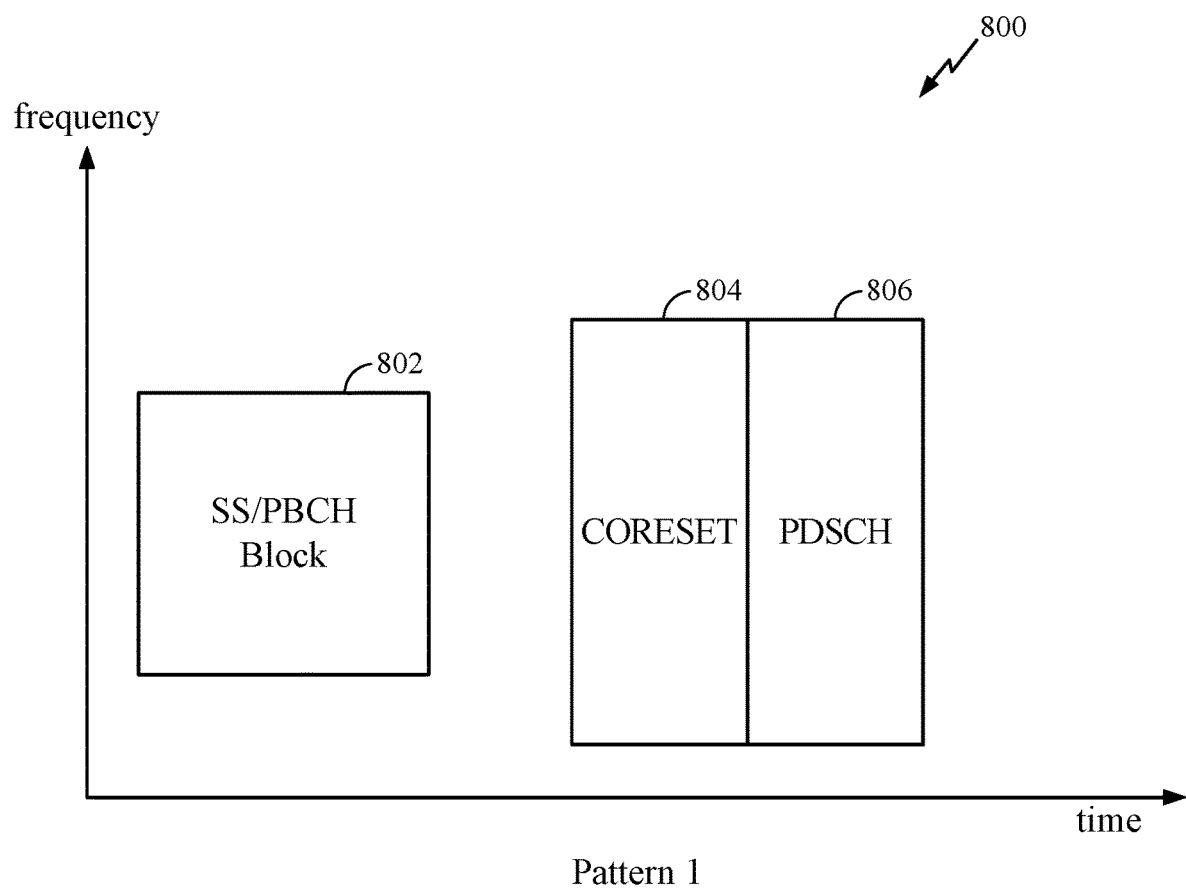
FIG. 8 shows an exemplary transmission resource mapping, according to aspects of the present disclosure.

FIG. 8 shows an exemplary transmission resource mapping 800, according to aspects of the present disclosure. In the exemplary mapping, a BS (e.g., BS 110a, shown in FIG. 1) transmits an SS/PBCH block 802. The SS/PBCH block includes a MIB conveying an index to a table that relates the time and frequency resources of the CORESET 804 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 806. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

Figure 9:
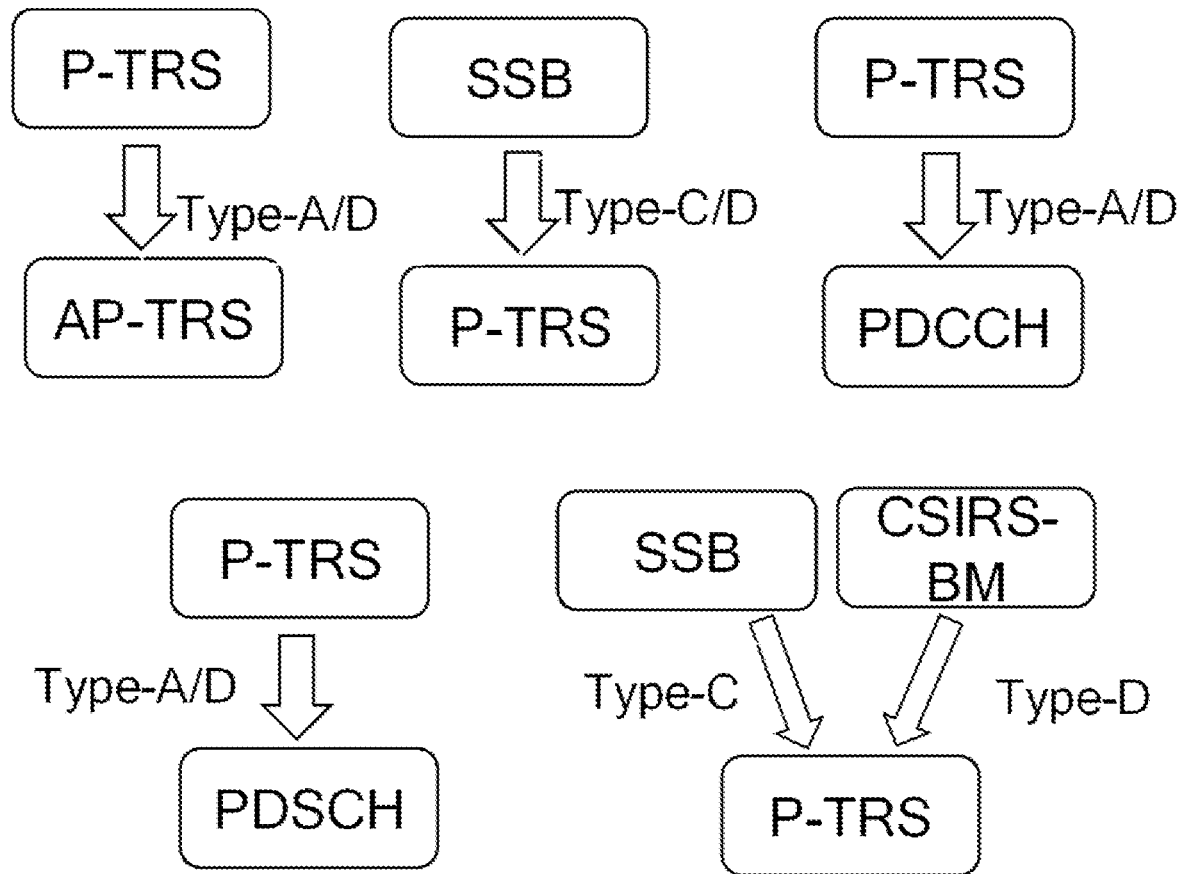
FIG. 9 illustrates example quasi co-location (QCL) relationships, in accordance with certain aspects of the present disclosure.

FIG. 9 illustrate examples of the association of DL reference signals with corresponding QCL types that may be indicated by a TCI-RS-SetConfig.

In the examples of FIG. 9, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 9, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (MIB).

Example Downlink Quasi Colocation (QCL) Prioritization Based On Downlink Physical Layer (PHY) Priority As noted above, certain assumptions, such as QCL assumptions, may help a UE process downlink transmissions. In some cases, overlapping downlink transmissions may have different QCL assumptions. Aspects of the present disclosure provide techniques that may help a UE prioritize one or the other in order to process the overlapping downlink transmissions.

UEs may communicate on different operating frequency ranges such as frequency range 1 (FR1) that includes sub-6 GHz frequency bands and frequency range 2 (FR2) that includes frequency bands from 24.25 GHz to 52.6 GHz.

In current systems, on FR2, QCL prioritization between overlapped PDSCHs may be left up to UE implementation, except for the case of a Paging Radio Network Temporary Identifier (P-RNTI) triggered system information (SI) acquisition, in which case a UE prioritizes physical downlink shared channel (PDSCH) scheduled by SI-RNTI over that scheduled by a cell RNTI (C-RNTI), a modulation and coding scheme C-RNTI (MCS-C-RNTI), and configured scheduling (CS-RNTI) in the same cell. In such cases, any other sort of DL priority indication, the UE may make undesirable decisions, like to drop such a transmission in favor of other transmissions (e.g., URLLC).

In some cases, a priority level may be assigned to different types of uplink and/or downlink physical layer (PHY) transmissions. For example, a two-level PHY priority (high and low) may be indicated for uplink transmissions. Example priorities may be as follows:

For SR, priority is configured per SR resource;
For P/SP CSI report on PUCCH, priority is low;
For AP/SP CSI report on PUSCH, priority is same as that indicated for PUSCH;
For UL DG, priority is indicated in DCI;
For UL CG, priority is RRC configured per type-1 and type-2 CG configuration;
(Re)activation DCI cannot overwrite the RRC configured priority;
For A/N of DL DG, priority is indicated in DCI;
For A/N of SPS, priority is RRC configured per SPS configuration;
For PRACH, no priority defined; and
For SRS, low priority for P/SP SRS and AP SRS triggered by DCI format 2_3.

PHY priority levels for downlink reception may also have use cases at least in FR2. Examples of downlink transmission PHY priority levels are as follows. For PDCCH transmissions:

Option 1: DL PHY priority can be indicated per CORESET or SS, e.g. in RRC IE of ControlResourceSet
Option 2: DL PHY priority can be indicated per CORESET pool index, if different pool indices are configured
Option 3: DL PHY priority can be indicated in PDCCH itself For DL channel/RS associated with UL feedback, such as PDSCH with acknowledgment (+A/N) or CSI-RS+CSI report on PUCCH/PUSCH:

DL PHY priority can be the same as UL PHY priority indicated for UL feedback

For DL channel/RS scheduled by DCI, such as PDSCH, AP CSI-RS, regardless with or without UL feedback:

A separate DL PHY priority can be indicated in DCI

For DL channel/RS configured by RRC or activated by DCI/MAC-CE, e.g. SPS, P/SP CSI-RS:

Option 1: DL PHY priority can be configured in corresponding RRC IE; or

Option 2: DL PHY priority can be indicated in activation DCI/MAC-CE.

Aspects of the present disclosure provide a set of rules that may help a UE determine how to prioritize downlink reception assumption (e.g., in FR2), in case of multiple time overlapping DL channels and/or reference signals (RS) have conflicting reception (e.g., QCL) assumptions. While some examples described herein may refer to prioritizing QCL assumptions, the techniques described herein may more generally be applied to any type of reception assumptions.

As an example, a UE may prioritize the QCL of DL channel/RS with high PHY priority. As will be described in greater detail below, if there are multiple DL channel/RS with the same high priority but with different QCL, existing rules (e.g., R15/16 rules) may be further applied to generate the final prioritized QCL. The techniques may be applied to process various types of DL channels and RS, for example, including PDCCH, PDSCH, and CSI-RS.

Figure 10:
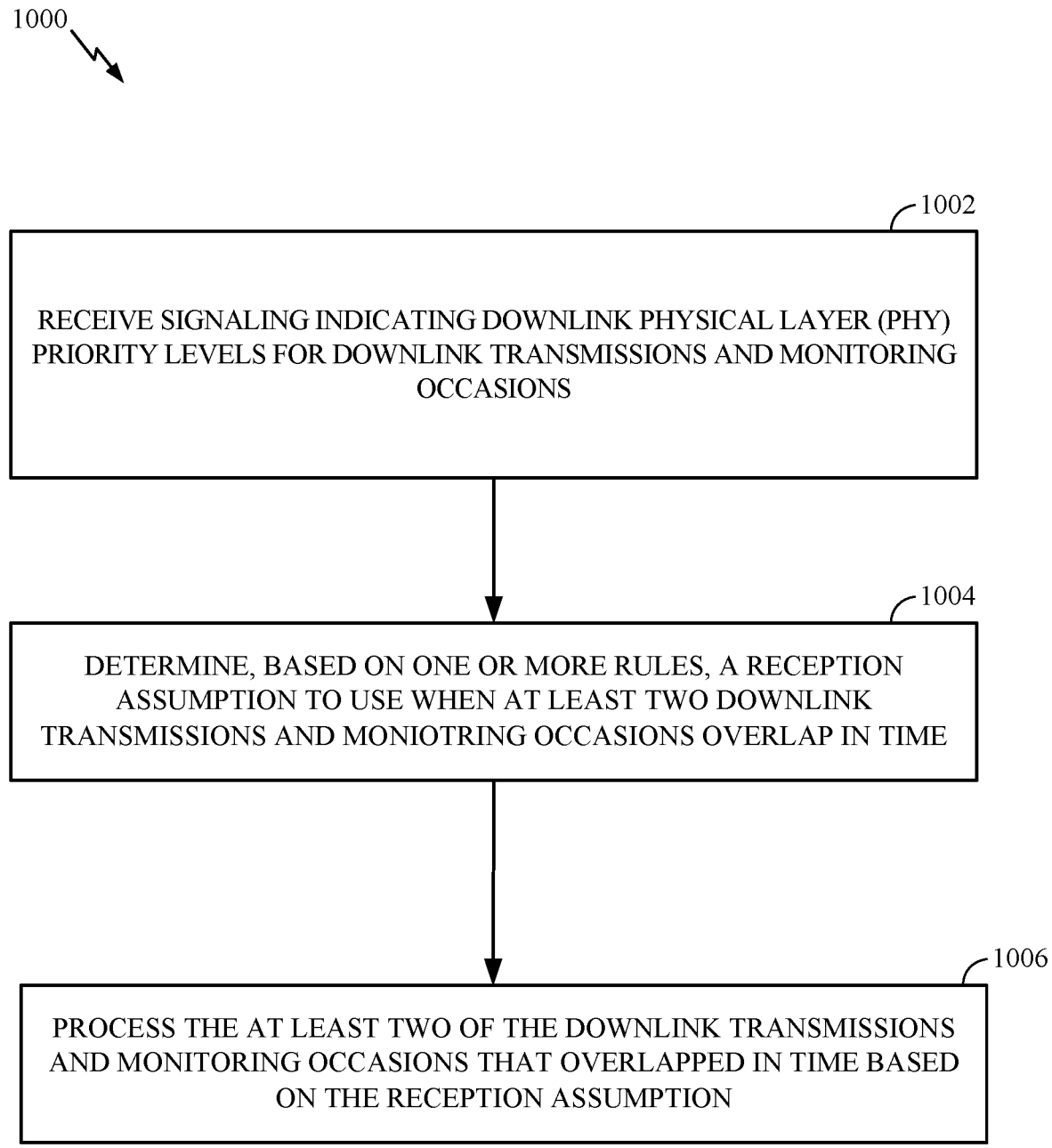
FIG. 10 illustrates example operations for wireless communications by a user equipment (UE), in accordance with certain aspects of the present disclosure.

FIG. 10 illustrates example operations 1000 for wireless communications by a wireless node such as a UE, in accordance with certain aspects of the present disclosure. For example, operations 1000 may be performed by a UE 120 of FIG. 1 to determine reception assumptions for overlapping downlink transmissions.

Operations 1000 begin, at 1002, by receiving signaling indicating downlink physical layer priority levels for downlink transmissions and monitoring occasions.

At 1004, the UE determines, based on one or more rules, a reception assumption to use when at least two downlink transmissions and monitoring occasions overlap in time.

At 1006, the UE process the at least two of the downlink transmissions and monitoring occasions that overlapped in time based on the reception assumption.

Figure 11:
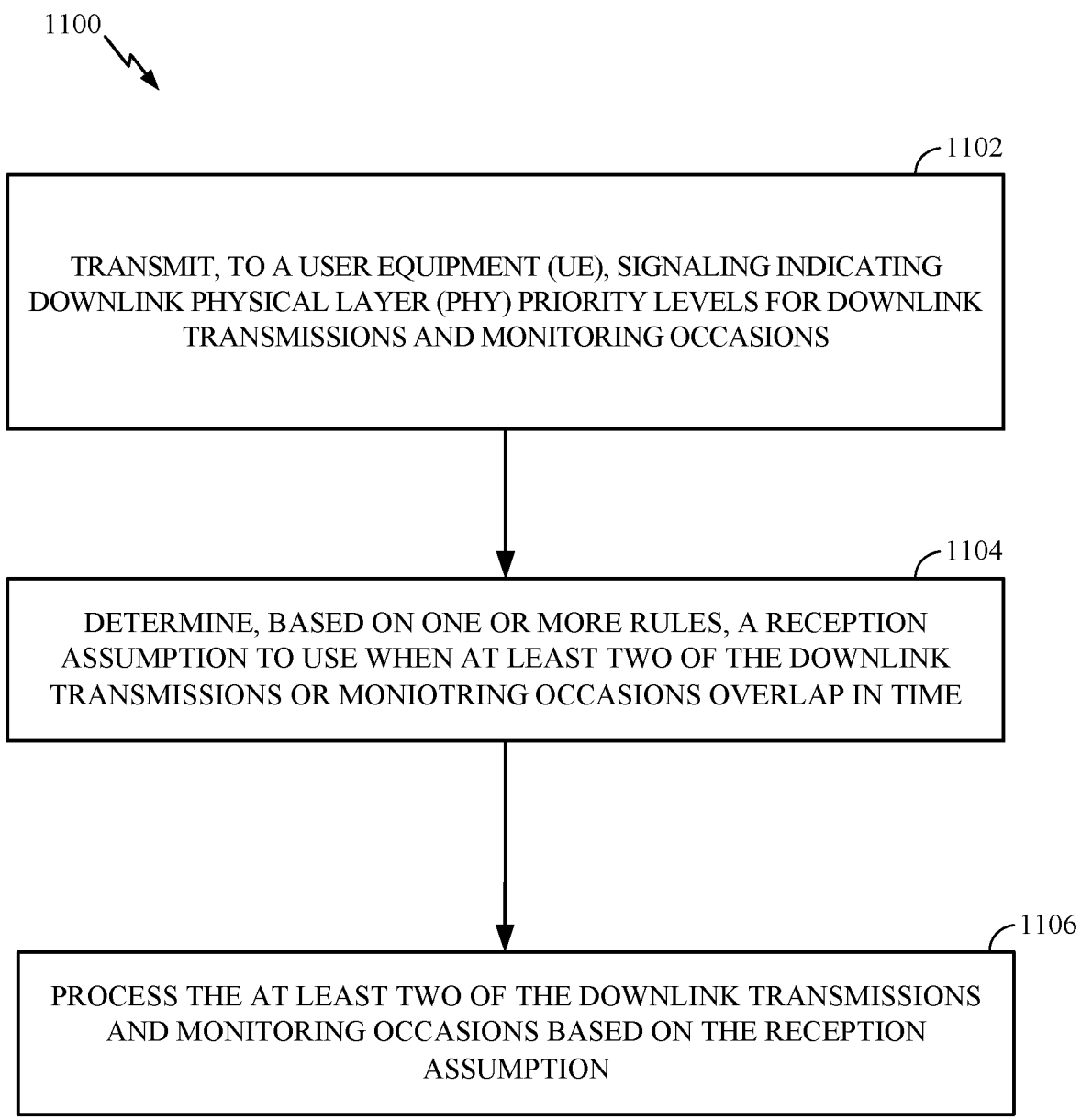
FIG. 11 illustrates example operations for wireless communications by a network entity, in accordance with certain aspects of the present disclosure.

FIG. 11 illustrates example operations 1100 for wireless communications by a network entity and may be considered complementary to operations 1000 of FIG. 10. For example, operations 1100 may be performed by a gNB scheduling transmissions to a UE 120 performing operations 1000 of FIG. 10. In this way, the gNB and UE can stay aligned regarding which QCL is prioritized by UE, for example, so the gNB can send more important information via a corresponding beam.

Operations 1100 begin, at 1102, by transmitting, to a user equipment (UE) signaling indicating downlink priority levels for downlink transmissions and monitoring occasions.

At 1104, the network entity determines, based on one or more rules, a reception assumption to use if at least two of the downlink transmissions or monitoring occasions overlap in time.

At 1106, the network entity processes the at least two of the downlink transmissions and monitoring occasions based on the reception assumption.

The techniques presented herein may be applied whether the overlapping DL channel/RS (e.g., with conflicting QCL) are in the same or in different CCs, or in the same CC while from the same or different TRPs.

The techniques may be useful because, conflicting QCL may not be completely avoided by a gNB due to various reasons. For example, a newly scheduled URLLC PDSCH may have to overlap with a previously scheduled eMBB PDSCH. As another example, 2 TRPs without tight coordination may individually schedule overlapped PDSCHs with conflicting QCL. Further, URLLC SPS may occasionally overlap with eMBB SPS.

In some cases, more than two levels of DL PHY priority may be used, in which case the highest level among all overlapped levels may be prioritized. In some cases, rather than utilizing a prioritization rule, the scenario that multiple overlapping DL channel/RS have conflicting QCL and with different DL PHY priority levels may be treated as an error case (e.g., the UE may not expected it to happen).

In some cases, a QCL prioritization rule may depend on the number of repetitions of one of the overlapped DL channel/RS. According to one option, QCL prioritization may purely depend on the number of repetitions (and not on DL PHY priority levels). In other words, QCL of the DL channel/RS with the most (or least) repetition number may be prioritized, regardless its DL PHY priority. As another option, QCL prioritization further depends on the number of repetitions, in addition to DL PHY priority. For example, among the DL channel/RS with the same PHY priority, QCL of the one with the most (or least) repetition number may be prioritized.

The techniques described herein may be applied in various use cases, for example, depending on the types of downlink transmissions or monitoring occasions that overlap.

For example, in a first use case, the techniques may be applied for overlapped PDSCH transmissions. As noted above, in current systems, QCL prioritization between overlapped PDSCHs may be left up to UE implementation, except for the case of P-RNTI triggered SI acquisition, where UE prioritizes PDSCH scheduled by SI-RNTI over that scheduled by C-RNTI, MCS-C-RNTI, and CS-RNTI in the same cell. Without any DL priority indication, the UE may drop one (e.g., eMBB) for another (e.g., URLLC).

Figure 12:
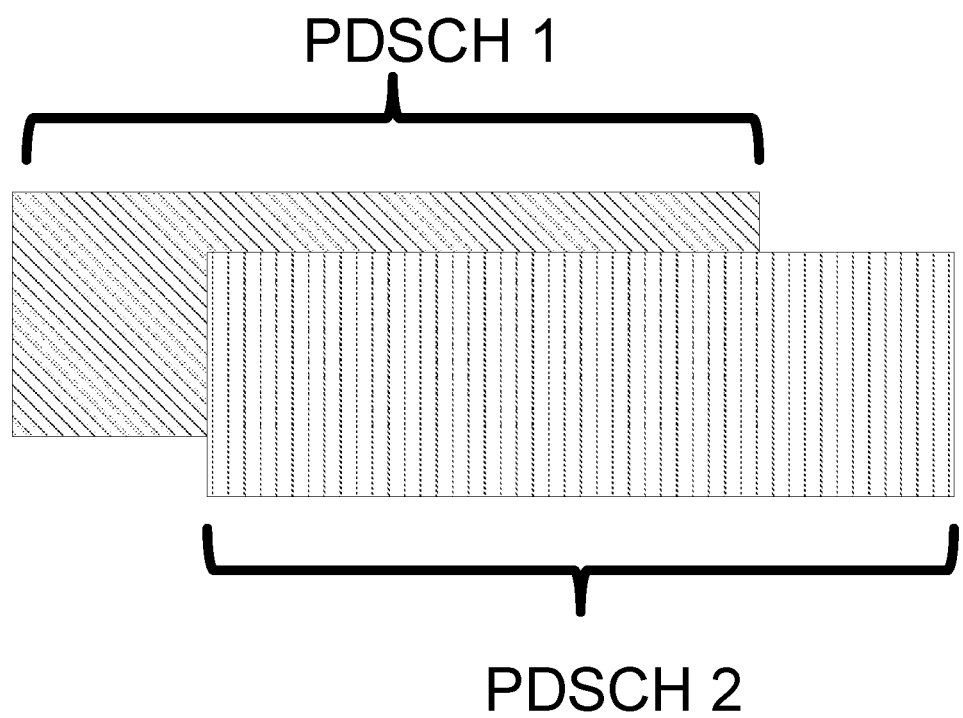
FIGS. 12-16 illustrate example scenarios in which aspects of the present disclosure may be utilized.

According to aspects presented herein, a UE may prioritize reception assumptions based on DL PHY level. For example, the techniques presented herein may be applied to the example shown in FIG. 12, where two PDSCH transmissions with a scheduling offset greater than a PDSCH beam switch latency threshold (e.g., meaning they may not have time to apply a new indicated beam) are overlapped, and they have different QCL Type-D (beam), as well as different DL PHY priorities. In this case, the UE may prioritize the QCL of one PDSCH with higher DL PHY priority. If multiple PDSCHs have the same high DL PHY priority level, the UE may prioritize QCL based on an existing rule (e.g., based on UE implementation) within the high priority PDSCHs.

Figure 13:
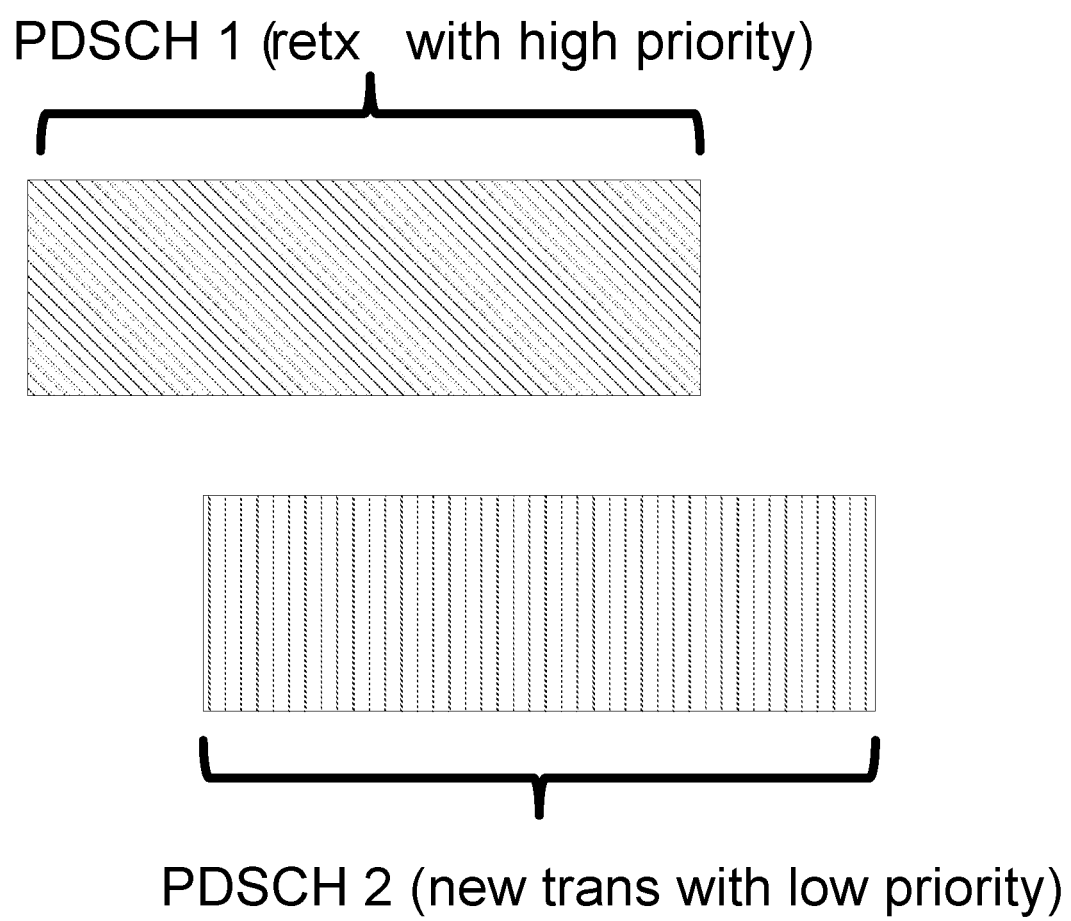

In some cases, if a UE decodes one of the PDSCH transmissions (e.g., PDSCH 1) successfully but the corresponding ACK is missed by the gNB, PDSCH 1 will be retransmitted. As illustrated in FIG. 13, the retransmitted PDSCH 1 with high DL priority overlaps with a newly transmitted PDSCH 2 with lower DL priority. In this case, because the UE has already successfully decoded PDSCH 1, it may prioritize the QCL of PDSCH 2, which is not decoded before. In some cases, at least when A/N for both PDSCH 1 & 2 share the same HARQ ACK info codebook, the UE may send an ACK (a positive acknowledgment) for PDSCH 1 even if the retransmitted PDSCH 1 is not decoded.

In a second use case, the techniques may be applied for overlapped PDCCH transmissions. In current systems (e.g., R15/16), if there is common search space (CSS) configured in multiple overlapping search spaces SSs, the QCL of the CSS with the lowest ID in the cell with lowest ID is prioritized. Without any PHY DL priority indication, the UE may drop user specific search space (USS) scheduling URLLC, which may not be allowed to be scheduled on the prioritized CSS (e.g. Type0/0A/1/2 CSS, or Type3 CSS on SCell). Type0/Type0A CSS is for SI-RNTI, Type1 CSS is for RA-RNTI or TC-RNTI, Type2 CSS is for P-RNTI. Type3 CSS can be for C-RNTI, MCS-C-RNTI, or CS-RNTI, but only on SPCell. RRC structure does not forbid Type3 CSS configured on SCell.

Figure 14:
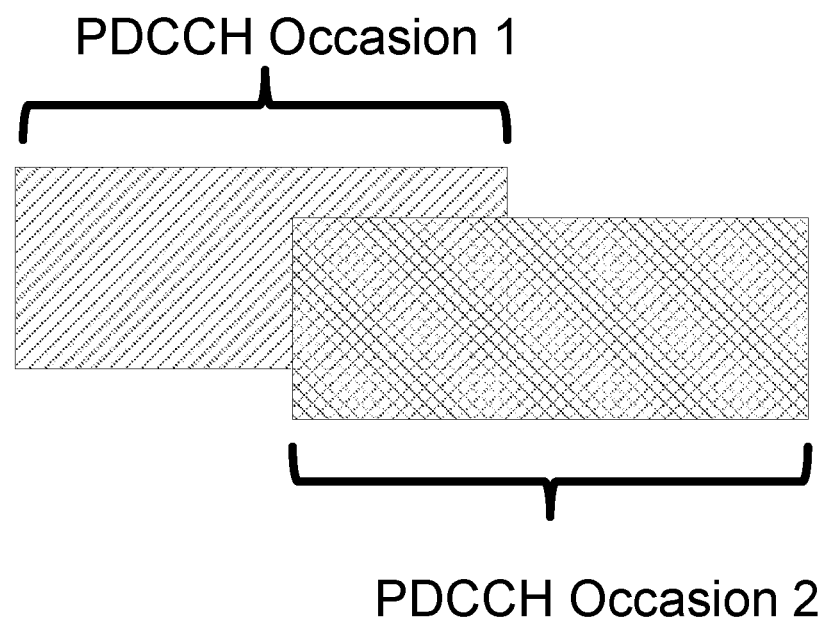

According to aspects presented herein, a UE may prioritize reception assumptions for overlapping PDCCH monitoring occasions based on DL PHY level. For example, the techniques presented herein may be applied to the example shown in FIG. 14, where two PDCCH monitoring occasion overlaps in time, and they have different QCL Type-D as well as different DL PHY priorities. In such cases, the UE may prioritize QCL of one monitoring occasion with high DL PHY priority. If multiple occasions have the same high DL PHY priority, the UE may prioritize QCL based on another rule (e.g., a R15 rule within the high priority monitoring occasions).

In a third use case, the techniques may be applied for overlapped PDCCH and PDSCH transmissions. In current systems (e.g., R15/16), prioritization between overlapped PDCCH and PDSCH may be up to UE implementation.

According to aspects presented herein, a UE may prioritize reception assumptions when PDCCH monitoring occasions overlap with PDSCH transmissions, based on DL PHY level. For example, the techniques presented herein may be applied to the example shown in FIG. 15, where at least one PDCCH monitoring occasion overlaps in time with at least one PDSCH (with scheduling offset greater than the PDSCH beam switch latency threshold) with different QCL Type-D as well as DL PHY priorities. The example in FIG. 15 shows two PDCCH monitoring occasions and two PDSCH transmissions.

In such cases, the UE may prioritize QCL of one DL channel with high DL PHY priority. If multiple DL channels have high priority, there are various options to prioritize QCL. For example, if there are multiple PDCCH monitoring occasions but no PDSCH, the UE may prioritize QCL based on R15 rule within high priority occasions. If there are multiple PDSCHs, but no PDCCH monitoring occasion, the UE may prioritize QCL based on R15 rule within high priority PDSCHs.

Figure 15:
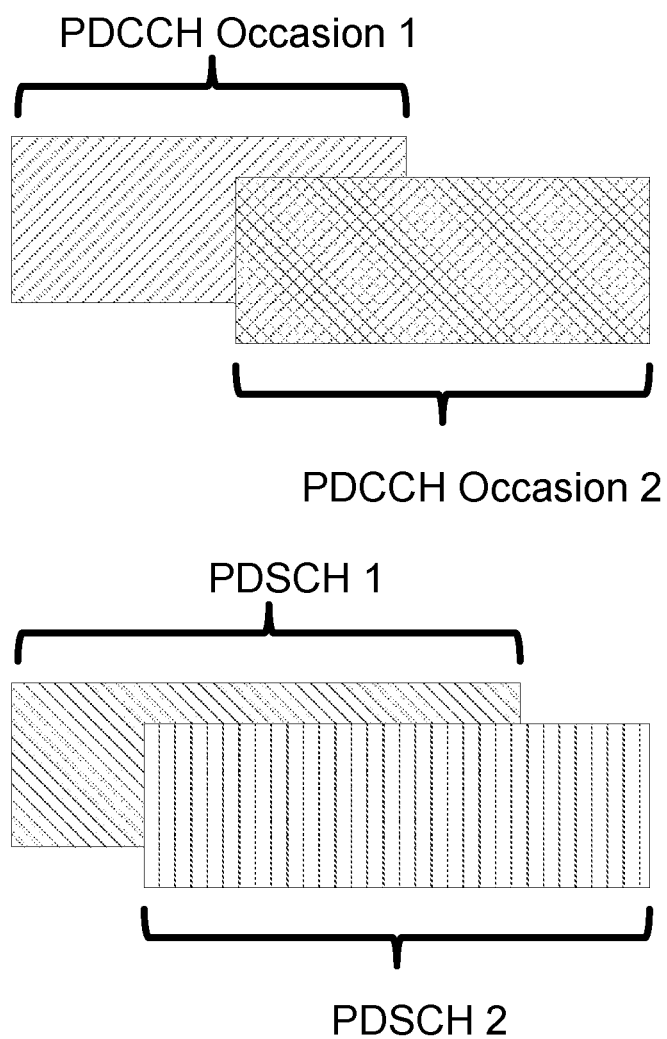

If there are at least one PDCCH monitoring occasion and at least one PDSCH, as shown in FIG. 15, which PDCCH/PDSCH QCL to be prioritized can be up to UE implementation. If PDCCH QCL is prioritized, the prior a rule (e.g., an R15 rule) within high priority occasions.

In a fourth use case, the techniques may be applied for a case where CSI-RS overlaps with PDCCH or PDSCH. In current systems, in this scenario, a UE may assume an overlapped CORESET and configured CSI-RS (except with repetition ON) are QCLed in Type-D. The UE may assume, however, that configured CSI-RS with repetition ON does not overlap with CORESET. Without any DL priority indication, the UE may drop CSI-RS with QCL different from overlapped CORESET and corresponding to high priority CSI report.

Figure 16:
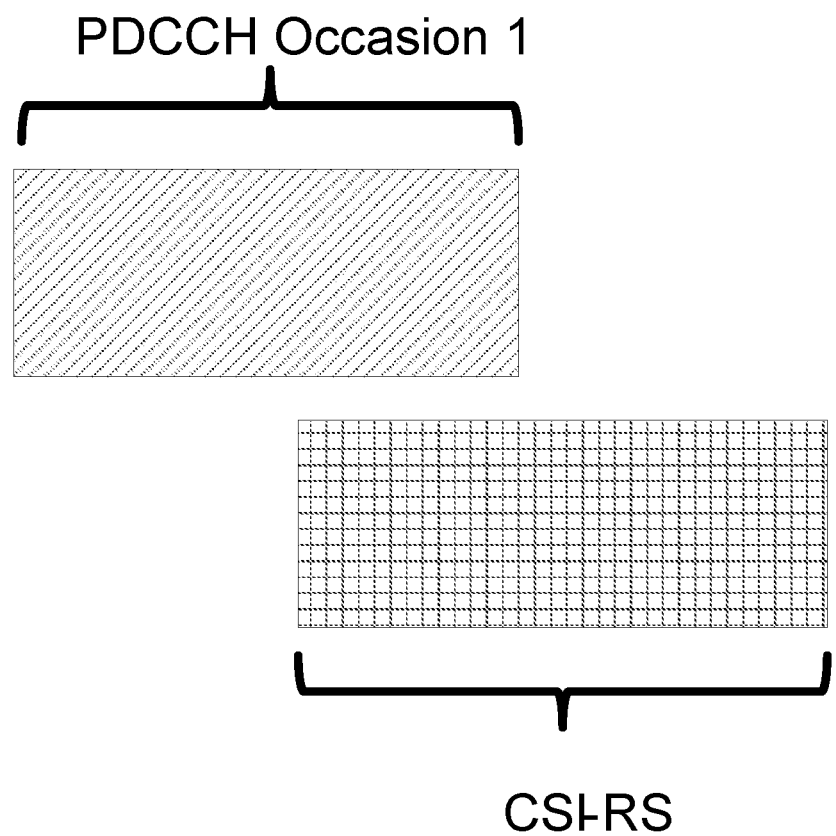

According to aspects presented herein, a UE may prioritize reception of CSI-RS or an overlapping PDCCH or PDSCH based on DL PHY priority level. For example, the techniques presented herein may be applied to the example scenario shown in FIG. 16, wherein CSI-RS (assuming repetition is not ON) overlaps with a PDCCH monitoring occasion, where the example assumes the CSI-RS and PDCCH monitoring occasion have different QCL Type-D as well as different DL PHY priorities. In this case, the UE may prioritize QCL of the DL transmission with higher DL PHY priority. This same type of prioritization rule may be applied in the case where CSI-RS and PDSCH with different QCLs and DL PHY priorities overlap.

The techniques presented herein may also be extended to the case of multiple transmitter receiver point (multi-TRP) scenarios, with different CORESET pool indices configured (and each different CORESET pool index corresponds to a different TRP). In such cases, the previously described rules for prioritizing QCL (e.g., based on DL PHY priority) may be applied to DL channel/RS scheduled by or associated with the same CORESET pool index. For example, assuming any combination of DL channel/RS from different CORESET pool indices can be simultaneously received by UE (with no QCL conflict between 2 TRPs), the prioritization rules may be applied per CORESET pool index.

In addition to the various aspects described above, aspects of specific combinations are within the scope of the disclosure, some of which are detailed below:

Aspect 1: A method for wireless communications by a wireless node, comprising: receiving signaling indicating downlink priority levels for downlink transmissions and monitoring occasions; determining, based on one or more rules, a reception assumption to use when at least two of the downlink transmissions and monitoring occasions overlap in time; and processing the at least two of the downlink transmissions and monitoring occasions that overlapped in time based on the reception assumption.

Aspect 2: The method of Aspect 1, wherein the reception assumption comprises a quasi-co-located (QCL) assumption for determining a spatial domain filter to receive the at least two of the downlink transmissions and monitoring occasions overlapped in time.

Aspect 3: The method of any one of Aspects 1-2, wherein the at least two of the downlink transmissions and monitoring occasions that overlapped in time are associated with a same cell or different cells.

Aspect 4: The method of any one of Aspects 1-3, wherein the downlink transmissions include a physical downlink shared channel (PDSCH) transmission with an offset associated with a physical downlink control channel (PDCCH), said offset being equal to or greater than a beam switch latency threshold.

Aspect 5: The method of any one of Aspects 1-4, wherein, according to at least a first one of the rules, the determination is to use a reception assumption for receiving the one with the highest downlink priority level among the at least two of the downlink transmissions and monitoring occasions overlapped in time.

Aspect 6: The method of any one of Aspects 1-5, wherein, according to at least a second one of the rules, if there are multiple overlapping ones of the downlink transmissions and monitoring occasions with the same highest downlink priority level and if the multiple overlapping ones have different reception assumptions, a second rule is used to determine which of the different reception assumptions should be used.

Aspect 7: The method of Aspect 5, wherein: the signaling indicates at least three different downlink priority levels; and according to the first rule, the determination is to use a reception assumption of a downlink transmission or monitoring occasion with the highest downlink priority level among the at least two of the downlink transmissions and monitoring occasions overlapped in time.

Aspect 8: The method of any one of Aspects 1-7, further comprising, according to at least one of the rules, treating those of the at least two of the downlink transmissions and monitoring occasions overlapped in time with different assumptions and different downlink priority levels as an error.

Aspect 9: The method of any one of Aspects 1-8, wherein, according to at least one of the rules, the determination depends at least in part on a number of repetitions used for one of the at least two of the downlink transmissions and monitoring occasions overlapped in time.

Aspect 10: The method of Aspect 9, wherein, according to the at least one of the rules, the determination is to use a reception assumption of one of the at least two of the downlink transmissions and monitoring occasions overlapped in time with most or least repetitions regardless of the downlink priority levels of the at least two of the downlink transmissions and monitoring occasions overlapped in time.

Aspect 11: The method of Aspect 9, wherein, according to the at least one of the rules, the determination is to use a reception assumption of one of the at least two of the downlink transmissions and monitoring occasions overlapped in time with most or least repetitions if the at least two of the downlink transmissions and monitoring occasions overlapped in time have a same downlink priority level.

Aspect 12: The method of any one of Aspects 1-11, wherein: the at least two of the downlink transmissions and monitoring occasions overlapped in time comprise multiple physical downlink shared channel (PDSCH) transmissions with different reception assumptions and different downlink priority levels; and according to the at least one of the rules, the determination is to use a reception assumption of one of the multiple PDSCH transmissions with a highest downlink priority level.

Aspect 13: The method of any one of Aspects 1-12, wherein: the at least two of the downlink transmissions and monitoring occasions overlapped in time comprise a physical downlink shared channel (PDSCH) transmissions with different reception assumptions and different downlink priority levels, including a retransmission of a first PDSCH that was previously successfully decoded and a transmission of a second PDSCH that was not previously successfully decoded; and according to the at least one of the rules, the determination is to use a reception assumption of the second PDSCH even if the downlink priority level of the first PDSCH is higher than the downlink priority level of the second PDSCH.

Aspect 14: The method of any one of Aspects 1-13, wherein: the at least two of the downlink transmissions and monitoring occasions overlapped in time comprise multiple physical downlink control channel (PDCCH) monitoring occasions with different reception assumptions and different downlink priority levels; and according to the at least one of the rules, the determination is to use a reception assumption of one of the multiple PDCCH monitoring occasion with a highest downlink priority level.

Aspect 15: The method of any one of Aspects 1-14, wherein: the at least two of the downlink transmissions and monitoring occasions overlapped in time comprise at least one physical downlink control channel (PDCCH) monitoring occasion and at least one physical downlink shared channel (PDSCH) with different reception assumptions and different downlink priority levels; and according to the at least one of the rules, the determination is to use a reception assumption of whichever of the PDCCH monitoring occasion or PDSCH transmission having a highest downlink priority level.

Aspect 16: The method of any one of Aspects 1-15, wherein: the at least two of the downlink transmissions and monitoring occasions overlapped in time comprise at least one channel state information reference signal (CSI-RS) without repetition that overlaps with at least one of a physical downlink control channel (PDCCH) monitoring occasion or a physical downlink shared channel (PDSCH) transmission, wherein the CSI-RS and the PDCCH monitoring occasion or PDSCH transmission have different reception assumptions and different downlink priority levels; and according to the at least one of the rules, the determination is to use a reception assumption of whichever of the CSI-RS or the PDCCH monitoring occasion or PDSCH transmission having a highest downlink priority level.

Aspect 17: The method of any one of Aspects 1-16, wherein: the at least two of the downlink transmissions and monitoring occasions overlapped in time comprise two or more downlink transmissions and monitoring occasions that overlap in time and are scheduled by or associated with a first control resource set (CORESET) pool index and two or more other downlink transmissions and monitoring occasions that overlap in time and are scheduled by or associated with a second CORESET pool index; and the method further comprising applying the one or more rules to determine a reception assumption to use to process at least two of the downlink transmissions and monitoring occasions scheduled by or associated with the same CORESET pool index.

18: The method of any one of Aspects 1-17, wherein, if different control resource set (CORESET) pool indices are configured, the signaling indicates downlink priority levels for physical downlink control channel (PDCCH) transmissions, per CORESET pool index.

Aspect 19: The method of any one of Aspects 1-18, wherein for downlink transmissions, monitoring occasions or downlink transmissions and monitoring occasions associated with uplink feedback, the signaling of downlink priority levels is the same as uplink priority levels indicated for the uplink feedback.

Aspect 20: The method of any one of Aspects 1-19, wherein for downlink transmissions and monitoring occasions or downlink transmissions and monitoring occasions scheduled by a downlink control information (DCI), their downlink priority level is signaled in the DCI.

Aspect 21: The method of any one of Aspects 1-20, wherein for downlink transmissions, monitoring occasions or downlink transmission and monitoring occasions configured via radio resource control (RRC), activated via downlink control information (DCI), or activated via a medium access control (MAC) control element (CE), their downlink priority level is signaled via at least one of a radio resource control (RRC) information element (IE) or via a DCI or MAC CE used for activation.

Aspect 22: A method for wireless communications by a network entity, comprising: transmitting, to a wireless node, signaling indicating downlink priority levels for downlink transmissions and monitoring occasions; determining, based on one or more rules, a reception assumption to use if at least two of the downlink transmissions or monitoring occasions overlap in time; and processing the at least two of the downlink transmissions and monitoring occasions based on the reception assumption.

Aspect 23: The method of Aspect 22, wherein the reception assumption comprises a quasi-co-located (QCL) assumption for determining a spatial domain filter to receive the at least two of the downlink transmissions and monitoring occasions overlapped in time.

Aspect 24: The method of any one of Aspects 22-23, wherein the at least two of the downlink transmissions and monitoring occasions that overlapped in time are associated with a same cell or different cells.

Aspect 25: The method of any one of Aspects 22-24, wherein the downlink transmissions include a physical downlink shared channel (PDSCH) transmission with an offset associated with a physical downlink control channel (PDCCH), said offset being equal to or greater than a beam switch latency threshold.

Aspect 26: The method of any one of Aspects 22-25, wherein, according to at least a first one of the rules, the determination is to use a reception assumption for receiving the one with the highest downlink priority level among the at least two of the downlink transmissions and monitoring occasions overlapped in time.

Aspect 27: The method of any one of Aspects 22-26, wherein, according to at least a second one of the rules, if there are multiple overlapping ones of the downlink transmissions and monitoring occasions with the same highest downlink priority level and if the multiple overlapping ones have different reception assumptions, a second rule is used to determine which of the different reception assumptions should be used.

28: The method of Aspect 26, wherein: the signaling indicates at least three different downlink priority levels; and according to the first rule, the determination is to use a reception assumption of a downlink transmission or monitoring occasion with the highest downlink priority level among the at least two of the downlink transmissions and monitoring occasions overlapped in time.

Aspect 29: The method of any one of Aspects 22-28, wherein, according to at least one of the rules, the determination depends at least in part on a number of repetitions used for one of the at least two of the downlink transmissions and monitoring occasions overlapped in time.

Aspect 30: The method of Aspect 29, wherein, according to the at least one of the rules, the determination is to use a reception assumption of one of the at least two of the downlink transmissions and monitoring occasions overlapped in time with most or least repetitions regardless of the downlink priority levels of the at least two of the downlink transmissions and monitoring occasions overlapped in time.

Aspect 31: The method of Aspect 29, wherein, according to the at least one of the rules, the determination is to use a reception assumption of one of the at least two of the downlink transmissions and monitoring occasions overlapped in time with most or least repetitions if the at least two of the downlink transmissions and monitoring occasions overlapped in time have a same downlink priority level.

Aspect 32: The method of any one of Aspects 22-31, wherein: the at least two of the downlink transmissions and monitoring occasions overlapped in time comprise multiple physical downlink shared channel (PDSCH) transmissions with different reception assumptions and different downlink priority levels; and according to the at least one of the rules, the determination is to use a reception assumption of one of the multiple PDSCH transmissions with a highest downlink priority level.

Aspect 33: The method of any one of Aspects 22-32, wherein: the at least two of the downlink transmissions and monitoring occasions overlapped in time comprise a physical downlink shared channel (PDSCH) transmissions with different reception assumptions and different downlink priority levels, including a retransmission of a first PDSCH that was previously successfully decoded and a transmission of a second PDSCH that was not previously successfully decoded; and according to the at least one of the rules, the determination is to use a reception assumption of the second PDSCH even if the downlink priority level of the first PDSCH is higher than the downlink priority level of the second PDSCH.

Aspect 34: The method of any one of Aspects 22-33, wherein: the at least two of the downlink transmissions and monitoring occasions overlapped in time comprise multiple physical downlink control channel (PDCCH) monitoring occasions with different reception assumptions and different downlink priority levels; and according to the at least one of the rules, the determination is to use a reception assumption of one of the multiple PDCCH monitoring occasion with a highest downlink priority level.

Aspect 35: The method of any one of Aspects 22-34, wherein: the at least two of the downlink transmissions and monitoring occasions overlapped in time comprise at least one physical downlink control channel (PDCCH) monitoring occasion and at least one physical downlink shared channel (PDSCH) with different reception assumptions and different downlink priority levels; and according to the at least one of the rules, the determination is to use a reception assumption of whichever of the PDCCH monitoring occasion or PDSCH transmission having a highest downlink priority level.

Aspect 36: The method of any one of Aspects 22-35, wherein: the at least two of the downlink transmissions and monitoring occasions overlapped in time comprise at least one channel state information reference signal (CSI-RS) without repetition that overlaps with at least one of a physical downlink control channel (PDCCH) monitoring occasion or a physical downlink shared channel (PDSCH) transmission, wherein the CSI-RS and the PDCCH monitoring occasion or PDSCH transmission have different reception assumptions and different downlink priority levels; and according to the at least one of the rules, the determination is to use a reception assumption of whichever of the CSI-RS or the PDCCH monitoring occasion or PDSCH transmission having a highest downlink priority level.

Aspect 37: The method of any one of Aspects 22-36, wherein: the at least two of the downlink transmissions and monitoring occasions overlapped in time comprise two or more downlink transmissions and monitoring occasions that overlap in time and are scheduled by or associated with a first control resource set (CORESET) pool index and two or more other downlink transmissions and monitoring occasions that overlap in time and are scheduled by or associated with a second CORESET pool index; and the method further comprising applying the one or more rules to determine a reception assumption to use to process at least two of the downlink transmissions and monitoring occasions scheduled by or associated with the same CORESET pool index.

Aspect 38: The method of any one of Aspects 22-37, wherein, if different control resource set (CORESET) pool indices are configured, the signaling indicates downlink priority levels for physical downlink control channel (PDCCH) transmissions, per CORESET pool index.

Aspect 39: The method of any one of Aspects 22-38, wherein for downlink transmissions, monitoring occasions or downlink transmissions and monitoring occasions associated with uplink feedback, the signaling of downlink priority levels is the same as uplink priority levels indicated for the uplink feedback.

Aspect 40: The method of any one of Aspects 22-39, wherein for downlink transmissions and monitoring occasions or downlink transmissions and monitoring occasions scheduled by a downlink control information (DCI), their downlink priority level is signaled in the DCI.

Aspect 41: The method of any one of Aspects 22-40, wherein for downlink transmissions, monitoring occasions or downlink transmission and monitoring occasions configured via radio resource control (RRC), activated via downlink control information (DCI), or activated via a medium access control (MAC) control element (CE), their downlink priority level is signaled via at least one of a radio resource control (RRC) information element (IE) or via a DCI or MAC CE used for activation.

Aspect 42: A wireless node, comprising: means for receiving signaling indicating downlink priority levels for downlink transmissions and monitoring occasions; means for determining, based on one or more rules, a reception assumption to use when at least two of the downlink transmissions and monitoring occasions overlap in time; and means for processing the at least two of the downlink transmissions and monitoring occasions that overlapped in time based on the reception assumption.

Aspect 43: The wireless node of Aspect 42, wherein the reception assumption comprises a quasi-co-located (QCL) assumption for determining a spatial domain filter to receive the at least two of the downlink transmissions and monitoring occasions overlapped in time.

Aspect 44: The wireless node of any one of Aspects 42-43, wherein the at least two of the downlink transmissions and monitoring occasions that overlapped in time are associated with a same cell or different cells.

Aspect 45: The wireless node of any one of Aspects 42-44, wherein the downlink transmissions include a physical downlink shared channel (PDSCH) transmission with an offset associated with a physical downlink control channel (PDCCH), said offset being equal to or greater than a beam switch latency threshold.

Aspect 46: The wireless node of any one of Aspects 42-45, wherein, according to at least a first one of the rules, the determination is to use a reception assumption for receiving the one with the highest downlink priority level among the at least two of the downlink transmissions and monitoring occasions overlapped in time.

Aspect 47: The wireless node of any one of Aspects 42-46, wherein, according to at least a second one of the rules, if there are multiple overlapping ones of the downlink transmissions and monitoring occasions with the same highest downlink priority level and if the multiple overlapping ones have different reception assumptions, a second rule is used to determine which of the different reception assumptions should be used.

Aspect 48: The wireless node of Aspect 46, wherein: the signaling indicates at least three different downlink priority levels; and according to the first rule, the determination is to use a reception assumption of a downlink transmission or monitoring occasion with the highest downlink priority level among the at least two of the downlink transmissions and monitoring occasions overlapped in time.

Aspect 49: The wireless node of any one of Aspects 42-48, further comprising, according to at least one of the rules, means for treating those of the at least two of the downlink transmissions and monitoring occasions overlapped in time with different assumptions and different downlink priority levels as an error.

Aspect 50: The wireless node of any one of Aspects 42-49, wherein, according to at least one of the rules, the determination depends at least in part on a number of repetitions used for one of the at least two of the downlink transmissions and monitoring occasions overlapped in time.

Aspect 51: The wireless node of Aspect 50, wherein, according to the at least one of the rules, the determination is to use a reception assumption of one of the at least two of the downlink transmissions and monitoring occasions overlapped in time with most or least repetitions regardless of the downlink priority levels of the at least two of the downlink transmissions and monitoring occasions overlapped in time.

Aspect 52: The wireless node of Aspect 50, wherein, according to the at least one of the rules, the determination is to use a reception assumption of one of the at least two of the downlink transmissions and monitoring occasions overlapped in time with most or least repetitions if the at least two of the downlink transmissions and monitoring occasions overlapped in time have a same downlink priority level.

Aspect 53: The wireless node of any one of Aspects 42-52, wherein: the at least two of the downlink transmissions and monitoring occasions overlapped in time comprise multiple physical downlink shared channel (PDSCH) transmissions with different reception assumptions and different downlink priority levels; and according to the at least one of the rules, the determination is to use a reception assumption of one of the multiple PDSCH transmissions with a highest downlink priority level.

Aspect 54: The wireless node of any one of Aspects 42-53, wherein: the at least two of the downlink transmissions and monitoring occasions overlapped in time comprise a physical downlink shared channel (PDSCH) transmissions with different reception assumptions and different downlink priority levels, including a retransmission of a first PDSCH that was previously successfully decoded and a transmission of a second PDSCH that was not previously successfully decoded; and according to the at least one of the rules, the determination is to use a reception assumption of the second PDSCH even if the downlink priority level of the first PDSCH is higher than the downlink priority level of the second PDSCH.

Aspect 55: The wireless node of any one of Aspects 42-54, wherein: the at least two of the downlink transmissions and monitoring occasions overlapped in time comprise multiple physical downlink control channel (PDCCH) monitoring occasions with different reception assumptions and different downlink priority levels; and according to the at least one of the rules, the determination is to use a reception assumption of one of the multiple PDCCH monitoring occasion with a highest downlink priority level.

Aspect 56: The wireless node of any one of Aspects 42-55, wherein: the at least two of the downlink transmissions and monitoring occasions overlapped in time comprise at least one physical downlink control channel (PDCCH) monitoring occasion and at least one physical downlink shared channel (PDSCH) with different reception assumptions and different downlink priority levels; and according to the at least one of the rules, the determination is to use a reception assumption of whichever of the PDCCH monitoring occasion or PDSCH transmission having a highest downlink priority level.

Aspect 57: The wireless node of any one of Aspects 42-56, wherein: the at least two of the downlink transmissions and monitoring occasions overlapped in time comprise at least one channel state information reference signal (CSI-RS) without repetition that overlaps with at least one of a physical downlink control channel (PDCCH) monitoring occasion or a physical downlink shared channel (PDSCH) transmission, wherein the CSI-RS and the PDCCH monitoring occasion or PDSCH transmission have different reception assumptions and different downlink priority levels; and according to the at least one of the rules, the determination is to use a reception assumption of whichever of the CSI-RS or the PDCCH monitoring occasion or PDSCH transmission having a highest downlink priority level.

Aspect 58: The wireless node of any one of Aspects 42-57, wherein: the at least two of the downlink transmissions and monitoring occasions overlapped in time comprise two or more downlink transmissions and monitoring occasions that overlap in time and are scheduled by or associated with a first control resource set (CORESET) pool index and two or more other downlink transmissions and monitoring occasions that overlap in time and are scheduled by or associated with a second CORESET pool index; and the wireless node further comprising means for applying the one or more rules to determine a reception assumption to use to process at least two of the downlink transmissions and monitoring occasions scheduled by or associated with the same CORESET pool index.

Aspect 59: The wireless node of any one of Aspects 42-58, wherein, if different control resource set (CORESET) pool indices are configured, the signaling indicates downlink priority levels for physical downlink control channel (PDCCH) transmissions, per CORESET pool index.

Aspect 60: The wireless node of any one of Aspects 42-59, wherein for downlink transmissions, monitoring occasions or downlink transmissions and monitoring occasions associated with uplink feedback, the signaling of downlink priority levels is the same as uplink priority levels indicated for the uplink feedback.

Aspect 61: The wireless node of any one of Aspects 42-60, wherein for downlink transmissions and monitoring occasions or downlink transmissions and monitoring occasions scheduled by a downlink control information (DCI), their downlink priority level is signaled in the DCI.

Aspect 62: The wireless node of any one of Aspects 42-61, wherein for downlink transmissions, monitoring occasions or downlink transmission and monitoring occasions configured via radio resource control (RRC), activated via downlink control information (DCI), or activated via a medium access control (MAC) control element (CE), their downlink priority level is signaled via at least one of a radio resource control (RRC) information element (IE) or via a DCI or MAC CE used for activation.

Aspect 63: A network entity, comprising: means for transmitting, to a wireless node, signaling indicating downlink priority levels for downlink transmissions and monitoring occasions; means for determining, based on one or more rules, a reception assumption to use if at least two of the downlink transmissions or monitoring occasions overlap in time; and means for processing the at least two of the downlink transmissions and monitoring occasions based on the reception assumption.

Aspect 64: The network entity of Aspect 63, wherein the reception assumption comprises a quasi-co-located (QCL) assumption for determining a spatial domain filter to receive the at least two of the downlink transmissions and monitoring occasions overlapped in time.

Aspect 65: The network entity of any one of Aspects 63-64, wherein the at least two of the downlink transmissions and monitoring occasions that overlapped in time are associated with a same cell or different cells.

Aspect 66: The network entity of any one of Aspects 63-65, wherein the downlink transmissions include a physical downlink shared channel (PDSCH) transmission with an offset associated with a physical downlink control channel (PDCCH), said offset being equal to or greater than a beam switch latency threshold.

Aspect 67: The network entity of any one of Aspects 63-66, wherein, according to at least a first one of the rules, the determination is to use a reception assumption for receiving the one with the highest downlink priority level among the at least two of the downlink transmissions and monitoring occasions overlapped in time.

Aspect 68: The network entity of any one of Aspects 63-67, wherein, according to at least a second one of the rules, if there are multiple overlapping ones of the downlink transmissions and monitoring occasions with the same highest downlink priority level and if the multiple overlapping ones have different reception assumptions, a second rule is used to determine which of the different reception assumptions should be used.

Aspect 69: The network entity of Aspect 67, wherein: the signaling indicates at least three different downlink priority levels; and according to the first rule, the determination is to use a reception assumption of a downlink transmission or monitoring occasion with the highest downlink priority level among the at least two of the downlink transmissions and monitoring occasions overlapped in time.

Aspect 70: The network entity of any one of Aspects 63-69, wherein, according to at least one of the rules, the determination depends at least in part on a number of repetitions used for one of the at least two of the downlink transmissions and monitoring occasions overlapped in time.

Aspect 71: The network entity of Aspect 70, wherein, according to the at least one of the rules, the determination is to use a reception assumption of one of the at least two of the downlink transmissions and monitoring occasions overlapped in time with most or least repetitions regardless of the downlink priority levels of the at least two of the downlink transmissions and monitoring occasions overlapped in time.

Aspect 72: The network entity of Aspect 70, wherein, according to the at least one of the rules, the determination is to use a reception assumption of one of the at least two of the downlink transmissions and monitoring occasions overlapped in time with most or least repetitions if the at least two of the downlink transmissions and monitoring occasions overlapped in time have a same downlink priority level.

Aspect 73: The network entity of any one of Aspects 63-72, wherein: the at least two of the downlink transmissions and monitoring occasions overlapped in time comprise multiple physical downlink shared channel (PDSCH) transmissions with different reception assumptions and different downlink priority levels; and according to the at least one of the rules, the determination is to use a reception assumption of one of the multiple PDSCH transmissions with a highest downlink priority level.

Aspect 74: The network entity of any one of Aspects 63-73, wherein: the at least two of the downlink transmissions and monitoring occasions overlapped in time comprise a physical downlink shared channel (PDSCH) transmissions with different reception assumptions and different downlink priority levels, including a retransmission of a first PDSCH that was previously successfully decoded and a transmission of a second PDSCH that was not previously successfully decoded; and according to the at least one of the rules, the determination is to use a reception assumption of the second PDSCH even if the downlink priority level of the first PDSCH is higher than the downlink priority level of the second PDSCH.

Aspect 75: The network entity of any one of Aspects 63-74, wherein: the at least two of the downlink transmissions and monitoring occasions overlapped in time comprise multiple physical downlink control channel (PDCCH) monitoring occasions with different reception assumptions and different downlink priority levels; and according to the at least one of the rules, the determination is to use a reception assumption of one of the multiple PDCCH monitoring occasion with a highest downlink priority level.

76: The network entity of any one of Aspects 63-75, wherein: the at least two of the downlink transmissions and monitoring occasions overlapped in time comprise at least one physical downlink control channel (PDCCH) monitoring occasion and at least one physical downlink shared channel (PDSCH) with different reception assumptions and different downlink priority levels; and according to the at least one of the rules, the determination is to use a reception assumption of whichever of the PDCCH monitoring occasion or PDSCH transmission having a highest downlink priority level.

Aspect 77: The network entity of any one of Aspects 63-76, wherein: the at least two of the downlink transmissions and monitoring occasions overlapped in time comprise at least one channel state information reference signal (CSI-RS) without repetition that overlaps with at least one of a physical downlink control channel (PDCCH) monitoring occasion or a physical downlink shared channel (PDSCH) transmission, wherein the CSI-RS and the PDCCH monitoring occasion or PDSCH transmission have different reception assumptions and different downlink priority levels; and according to the at least one of the rules, the determination is to use a reception assumption of whichever of the CSI-RS or the PDCCH monitoring occasion or PDSCH transmission having a highest downlink priority level.

Aspect 78: The network entity of any one of Aspects 63-77, wherein: the at least two of the downlink transmissions and monitoring occasions overlapped in time comprise two or more downlink transmissions and monitoring occasions that overlap in time and are scheduled by or associated with a first control resource set (CORESET) pool index and two or more other downlink transmissions and monitoring occasions that overlap in time and are scheduled by or associated with a second CORESET pool index; and the network entity further comprising means for applying the one or more rules to determine a reception assumption to use to process at least two of the downlink transmissions and monitoring occasions scheduled by or associated with the same CORESET pool index.

Aspect 79: The network entity of any one of Aspects 63-78, wherein, if different control resource set (CORESET) pool indices are configured, the signaling indicates downlink priority levels for physical downlink control channel (PDCCH) transmissions, per CORESET pool index.

Aspect 80: The network entity of any one of Aspects 63-79, wherein for downlink transmissions, monitoring occasions or downlink transmissions and monitoring occasions associated with uplink feedback, the signaling of downlink priority levels is the same as uplink priority levels indicated for the uplink feedback.

Aspect 81: The network entity of any one of Aspects 63-80, wherein for downlink transmissions and monitoring occasions or downlink transmissions and monitoring occasions scheduled by a downlink control information (DCI), their downlink priority level is signaled in the DCI.

Aspect 82: The network entity of any one of Aspects 63-81, wherein for downlink transmissions, monitoring occasions or downlink transmission and monitoring occasions configured via radio resource control (RRC), activated via downlink control information (DCI), or activated via a medium access control (MAC) control element (CE), their downlink priority level is signaled via at least one of a radio resource control (RRC) information element (IE) or via a DCI or MAC CE used for activation.

Aspect 83: A wireless node, comprising: a receiver configured to receive signaling indicating downlink priority levels for downlink transmissions and monitoring occasions; and a processing system configured to determine, based on one or more rules, a reception assumption to use when at least two of the downlink transmissions and monitoring occasions overlap in time and process the at least two of the downlink transmissions and monitoring occasions that overlapped in time based on the reception assumption.

Aspect 84. The wireless node of Aspect 83, wherein the reception assumption comprises a quasi-co-located (QCL) assumption for determining a spatial domain filter to receive the at least two of the downlink transmissions and monitoring occasions overlapped in time.

Aspect 85: The wireless node of any one of Aspects 83-84, wherein the at least two of the downlink transmissions and monitoring occasions that overlapped in time are associated with a same cell or different cells.

Aspect 86: The wireless node of any one of Aspects 83-85, wherein the downlink transmissions include a physical downlink shared channel (PDSCH) transmission with an offset associated with a physical downlink control channel (PDCCH), said offset being equal to or greater than a beam switch latency threshold.

Aspect 87: The wireless node of any one of Aspects 83-86, wherein, according to at least a first one of the rules, the determination is to use a reception assumption for receiving the one with the highest downlink priority level among the at least two of the downlink transmissions and monitoring occasions overlapped in time.

Aspect 88: The wireless node of any one of Aspects 83-87, wherein, according to at least a second one of the rules, if there are multiple overlapping ones of the downlink transmissions and monitoring occasions with the same highest downlink priority level and if the multiple overlapping ones have different reception assumptions, a second rule is used to determine which of the different reception assumptions should be used.

Aspect 89: The wireless node of Aspect 87, wherein: the signaling indicates at least three different downlink priority levels; and according to the first rule, the determination is to use a reception assumption of a downlink transmission or monitoring occasion with the highest downlink priority level among the at least two of the downlink transmissions and monitoring occasions overlapped in time.

Aspect 90: The wireless node of any one of Aspects 83-88, further comprising, according to at least one of the rules, treating those of the at least two of the downlink transmissions and monitoring occasions overlapped in time with different assumptions and different downlink priority levels as an error.

Aspect 91: The wireless node of any one of Aspects 83-89, wherein, according to at least one of the rules, the determination depends at least in part on a number of repetitions used for one of the at least two of the downlink transmissions and monitoring occasions overlapped in time.

Aspect 92: The wireless node of Aspect 91, wherein, according to the at least one of the rules, the determination is to use a reception assumption of one of the at least two of the downlink transmissions and monitoring occasions overlapped in time with most or least repetitions regardless of the downlink priority levels of the at least two of the downlink transmissions and monitoring occasions overlapped in time.

Aspect 93: The wireless node of Aspect 91, wherein, according to the at least one of the rules, the determination is to use a reception assumption of one of the at least two of the downlink transmissions and monitoring occasions overlapped in time with most or least repetitions if the at least two of the downlink transmissions and monitoring occasions overlapped in time have a same downlink priority level.

Aspect 94: The wireless node of any one of Aspects 83-93, wherein: the at least two of the downlink transmissions and monitoring occasions overlapped in time comprise multiple physical downlink shared channel (PDSCH) transmissions with different reception assumptions and different downlink priority levels; and according to the at least one of the rules, the determination is to use a reception assumption of one of the multiple PDSCH transmissions with a highest downlink priority level.

Aspect 95: The wireless node of any one of Aspects 83-94, wherein: the at least two of the downlink transmissions and monitoring occasions overlapped in time comprise a physical downlink shared channel (PDSCH) transmissions with different reception assumptions and different downlink priority levels, including a retransmission of a first PDSCH that was previously successfully decoded and a transmission of a second PDSCH that was not previously successfully decoded; and according to the at least one of the rules, the determination is to use a reception assumption of the second PDSCH even if the downlink priority level of the first PDSCH is higher than the downlink priority level of the second PDSCH.

Aspect 96: The wireless node of any one of Aspects 83-95, wherein: the at least two of the downlink transmissions and monitoring occasions overlapped in time comprise multiple physical downlink control channel (PDCCH) monitoring occasions with different reception assumptions and different downlink priority levels; and according to the at least one of the rules, the determination is to use a reception assumption of one of the multiple PDCCH monitoring occasion with a highest downlink priority level.

Aspect 97: The wireless node of any one of Aspects 83-96, wherein: the at least two of the downlink transmissions and monitoring occasions overlapped in time comprise at least one physical downlink control channel (PDCCH) monitoring occasion and at least one physical downlink shared channel (PDSCH) with different reception assumptions and different downlink priority levels; and according to the at least one of the rules, the determination is to use a reception assumption of whichever of the PDCCH monitoring occasion or PDSCH transmission having a highest downlink priority level.

Aspect 98: The wireless node of any one of Aspects 83-97, wherein: the at least two of the downlink transmissions and monitoring occasions overlapped in time comprise at least one channel state information reference signal (CSI-RS) without repetition that overlaps with at least one of a physical downlink control channel (PDCCH) monitoring occasion or a physical downlink shared channel (PDSCH) transmission, wherein the CSI-RS and the PDCCH monitoring occasion or PDSCH transmission have different reception assumptions and different downlink priority levels; and according to the at least one of the rules, the determination is to use a reception assumption of whichever of the CSI-RS or the PDCCH monitoring occasion or PDSCH transmission having a highest downlink priority level.

Aspect 99: The wireless node of any one of Aspects 83-98, wherein: the at least two of the downlink transmissions and monitoring occasions overlapped in time comprise two or more downlink transmissions and monitoring occasions that overlap in time and are scheduled by or associated with a first control resource set (CORESET) pool index and two or more other downlink transmissions and monitoring occasions that overlap in time and are scheduled by or associated with a second CORESET pool index; and the processing system is further configured to apply the one or more rules to determine a reception assumption to use to process at least two of the downlink transmissions and monitoring occasions scheduled by or associated with the same CORESET pool index.

Aspect 100: The wireless node of any one of Aspects 83-99, wherein, if different control resource set (CORESET) pool indices are configured, the signaling indicates downlink priority levels for physical downlink control channel (PDCCH) transmissions, per CORESET pool index.

Aspect 101: The wireless node of any one of Aspects 83-100, wherein for downlink transmissions, monitoring occasions or downlink transmissions and monitoring occasions associated with uplink feedback, the signaling of downlink priority levels is the same as uplink priority levels indicated for the uplink feedback.

Aspect 102: The wireless node of any one of Aspects 83-101, wherein for downlink transmissions and monitoring occasions or downlink transmissions and monitoring occasions scheduled by a downlink control information (DCI), their downlink priority level is signaled in the DCI.

Aspect 103: The wireless node of any one of Aspects 83-102, wherein for downlink transmissions, monitoring occasions or downlink transmission and monitoring occasions configured via radio resource control (RRC), activated via downlink control information (DCI), or activated via a medium access control (MAC) control element (CE), their downlink priority level is signaled via at least one of a radio resource control (RRC) information element (IE) or via a DCI or MAC CE used for activation.

Aspect 104: A network entity, comprising: a transmitter configured to transmit, to a wireless node, signaling indicating downlink priority levels for downlink transmissions and monitoring occasions; and a processing system configured to determine, based on one or more rules, a reception assumption to use if at least two of the downlink transmissions or monitoring occasions overlap in time and process the at least two of the downlink transmissions and monitoring occasions based on the reception assumption.

Aspect 105: The network entity of Aspect 104, wherein the reception assumption comprises a quasi-co-located (QCL) assumption for determining a spatial domain filter to receive the at least two of the downlink transmissions and monitoring occasions overlapped in time.

Aspect 106: The network entity of any one of Aspects 104-105, wherein the at least two of the downlink transmissions and monitoring occasions that overlapped in time are associated with a same cell or different cells.

Aspect 107: The network entity of any one of Aspects 104-106, wherein the downlink transmissions include a physical downlink shared channel (PDSCH) transmission with an offset associated with a physical downlink control channel (PDCCH), said offset being equal to or greater than a beam switch latency threshold.

Aspect 108: The network entity of any one of Aspects 104-107, wherein, according to at least a first one of the rules, the determination is to use a reception assumption for receiving the one with the highest downlink priority level among the at least two of the downlink transmissions and monitoring occasions overlapped in time.

Aspect 109: The network entity of any one of Aspects 104-108, wherein, according to at least a second one of the rules, if there are multiple overlapping ones of the downlink transmissions and monitoring occasions with the same highest downlink priority level and if the multiple overlapping ones have different reception assumptions, a second rule is used to determine which of the different reception assumptions should be used.

Aspect 110: The network entity of Aspect 108, wherein: the signaling indicates at least three different downlink priority levels; and according to the first rule, the determination is to use a reception assumption of a downlink transmission or monitoring occasion with the highest downlink priority level among the at least two of the downlink transmissions and monitoring occasions overlapped in time.

Aspect 111: The network entity of any one of Aspects 104-110, wherein, according to at least one of the rules, the determination depends at least in part on a number of repetitions used for one of the at least two of the downlink transmissions and monitoring occasions overlapped in time.

Aspect 112: The network entity of Aspect 111, wherein, according to the at least one of the rules, the determination is to use a reception assumption of one of the at least two of the downlink transmissions and monitoring occasions overlapped in time with most or least repetitions regardless of the downlink priority levels of the at least two of the downlink transmissions and monitoring occasions overlapped in time.

Aspect 113: The network entity of Aspect 111, wherein, according to the at least one of the rules, the determination is to use a reception assumption of one of the at least two of the downlink transmissions and monitoring occasions overlapped in time with most or least repetitions if the at least two of the downlink transmissions and monitoring occasions overlapped in time have a same downlink priority level.

Aspect 114: The network entity of any one of Aspects 104-113, wherein: the at least two of the downlink transmissions and monitoring occasions overlapped in time comprise multiple physical downlink shared channel (PDSCH) transmissions with different reception assumptions and different downlink priority levels; and according to the at least one of the rules, the determination is to use a reception assumption of one of the multiple PDSCH transmissions with a highest downlink priority level.

Aspect 115: The network entity of any one of Aspects 104-114, wherein: the at least two of the downlink transmissions and monitoring occasions overlapped in time comprise a physical downlink shared channel (PDSCH) transmissions with different reception assumptions and different downlink priority levels, including a retransmission of a first PDSCH that was previously successfully decoded and a transmission of a second PDSCH that was not previously successfully decoded; and according to the at least one of the rules, the determination is to use a reception assumption of the second PDSCH even if the downlink priority level of the first PDSCH is higher than the downlink priority level of the second PDSCH.

Aspect 116: The network entity of any one of Aspects 104-115, wherein: the at least two of the downlink transmissions and monitoring occasions overlapped in time comprise multiple physical downlink control channel (PDCCH) monitoring occasions with different reception assumptions and different downlink priority levels; and according to the at least one of the rules, the determination is to use a reception assumption of one of the multiple PDCCH monitoring occasion with a highest downlink priority level.

Aspect 117: The network entity of any one of Aspects 104-116, wherein: the at least two of the downlink transmissions and monitoring occasions overlapped in time comprise at least one physical downlink control channel (PDCCH) monitoring occasion and at least one physical downlink shared channel (PDSCH) with different reception assumptions and different downlink priority levels; and according to the at least one of the rules, the determination is to use a reception assumption of whichever of the PDCCH monitoring occasion or PDSCH transmission having a highest downlink priority level.

Aspect 118: The network entity of any one of Aspects 104-117, wherein: the at least two of the downlink transmissions and monitoring occasions overlapped in time comprise at least one channel state information reference signal (CSI-RS) without repetition that overlaps with at least one of a physical downlink control channel (PDCCH) monitoring occasion or a physical downlink shared channel (PDSCH) transmission, wherein the CSI-RS and the PDCCH monitoring occasion or PDSCH transmission have different reception assumptions and different downlink priority levels; and according to the at least one of the rules, the determination is to use a reception assumption of whichever of the CSI-RS or the PDCCH monitoring occasion or PDSCH transmission having a highest downlink priority level.

Aspect 119: The network entity of any one of Aspects 104-118, wherein: the at least two of the downlink transmissions and monitoring occasions overlapped in time comprise two or more downlink transmissions and monitoring occasions that overlap in time and are scheduled by or associated with a first control resource set (CORESET) pool index and two or more other downlink transmissions and monitoring occasions that overlap in time and are scheduled by or associated with a second CORESET pool index; and the processing system is further configured to apply the one or more rules to determine a reception assumption to use to process at least two of the downlink transmissions and monitoring occasions scheduled by or associated with the same CORESET pool index.

Aspect 120: The network entity of any one of Aspects 104-119, wherein, if different control resource set (CORESET) pool indices are configured, the signaling indicates downlink priority levels for physical downlink control channel (PDCCH) transmissions, per CORESET pool index.

Aspect 121: The network entity of any one of Aspects 104-120, wherein for downlink transmissions, monitoring occasions or downlink transmissions and monitoring occasions associated with uplink feedback, the signaling of downlink priority levels is the same as uplink priority levels indicated for the uplink feedback.

Aspect 122: The network entity of any one of Aspects 104-121, wherein for downlink transmissions and monitoring occasions or downlink transmissions and monitoring occasions scheduled by a downlink control information (DCI), their downlink priority level is signaled in the DCI.

Aspect 123: The network entity of any one of Aspects 104-122, wherein for downlink transmissions, monitoring occasions or downlink transmission and monitoring occasions configured via radio resource control (RRC), activated via downlink control information (DCI), or activated via a medium access control (MAC) control element (CE), their downlink priority level is signaled via at least one of a radio resource control (RRC) information element (IE) or via a DCI or MAC CE used for activation.

Aspect 124: An apparatus for wireless communications by a wireless node, comprising: an interface configured to obtain signaling indicating downlink priority levels for downlink transmissions and monitoring occasions; and a processing system configured to determine, based on one or more rules, a reception assumption to use when at least two of the downlink transmissions and monitoring occasions overlap in time and process the at least two of the downlink transmissions and monitoring occasions that overlapped in time based on the reception assumption.

Aspect 125: An apparatus for wireless communications by a network entity, comprising: an interface configured to output signaling for transmission to a wireless node, said signaling indicating downlink priority levels for downlink transmissions and monitoring occasions; and a processing system configured to determine, based on one or more rules, a reception assumption to use if at least two of the downlink transmissions or monitoring occasions overlap in time and process the at least two of the downlink transmissions and monitoring occasions based on the reception assumption.

Aspect 126: A computer-readable medium for wireless communications comprising instructions executable to: obtain signaling indicating downlink priority levels for downlink transmissions and monitoring occasions; determine, based on one or more rules, a reception assumption to use when at least two of the downlink transmissions and monitoring occasions overlap in time; and process the at least two of the downlink transmissions and monitoring occasions that overlapped in time based on the reception assumption.

Aspect 127: A computer-readable medium for wireless communications comprising instructions executable to: output, for transmission to a wireless node, signaling indicating downlink priority levels for downlink transmissions and monitoring occasions; determine, based on one or more rules, a reception assumption to use if at least two of the downlink transmissions or monitoring occasions overlap in time; and process the at least two of the downlink transmissions and monitoring occasions based on the reception assumption.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 458, 464, 466, and/or controller/processor 480 of the UE 120 and/or processors 420, 430, 438, and/or controller/processor 440 of the BS 110 shown in FIG. 4 may be configured to perform operations 1000 of FIG. 10 or operations 1100 of FIG. 11.

Means for receiving may include a receiver (such as one or more antennas or receive processors) illustrated in FIG. 4. Means for transmitting may include a transmitter (such as one or more antennas or transmit processors) illustrated in FIG. 4. Means for determining, means for processing, means for treating, and means for applying may include a processing system, which may include one or more processors, such as processors 458, 464, 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless node, comprising:
   memory comprising computer-executable instructions; and
   a processing system configured to execute the computer-executable instructions and cause the wireless node to:
   receive signaling indicating downlink priority levels for downlink transmissions and monitoring occasions;
   determine, based on one or more rules, a reception assumption to use when at least two of the downlink transmissions and monitoring occasions overlap in time; and process the at least two of the downlink transmissions and monitoring occasions that overlapped in time based on the reception assumption,
wherein the downlink priority levels are the same as uplink priority levels indicated for uplink feedback associated with the downlink transmissions and monitoring occasions.

2. A wireless node, comprising:
memory comprising computer-executable instructions; and
a processing system configured to execute computer-executable instructions and cause the wireless node to:
receive signaling indicating downlink priority levels for downlink transmissions and monitoring occasions;
determine, based on one or more rules, a reception assumption to use when at least two of the downlink transmissions and monitoring occasions overlap in time; and
process the at least two of the downlink transmissions and monitoring occasions that overlapped in time based on the reception assumption,
(i) wherein the signaling indicates at least three different downlink priority levels, and the processing system is configured to execute computer-executable instructions and cause the wireless node to determine to use a reception assumption of one of the at least two of the downlink transmissions and monitoring occasions overlapped in time with a highest downlink priority level; or
(ii) wherein the processing system is configured to execute computer-executable instructions and cause the wireless node to determine to use a reception assumption of one of the at least two of the downlink transmissions and monitoring occasions overlapped in time with most or least repetitions regardless of the downlink priority levels of the at least two of the downlink transmissions and monitoring occasions overlapped in time; or
(iii) wherein the processing system is configured to execute computer-executable instructions and cause the wireless node to determine to use a reception assumption of one of the at least two of the downlink transmissions and monitoring occasions overlapped in time with most or least repetitions if the at least two of the downlink transmissions and monitoring occasions overlapped in time have a same downlink priority level.

3. The wireless node of claim 2, wherein the signaling indicates the at least three different downlink priority levels, and the processing system is configured to execute computer-executable instructions and cause the wireless node to determine to use the reception assumption of the one of the at least two of the downlink transmissions and monitoring occasions overlapped in time with the highest downlink priority level.

4. The wireless node of claim 2, wherein the processing system is configured to execute computer-executable instructions and cause the wireless node to determine to use the reception assumption of the one of the at least two of the downlink transmissions and monitoring occasions overlapped in time with the most or least repetitions regardless of the downlink priority levels of the at least two of the downlink transmissions and monitoring occasions overlapped in time.

5. The wireless node of claim 2, wherein the processing system is configured to execute computer-executable instructions and cause the wireless node to determine to use the reception assumption of the one of the at least two of the downlink transmissions and monitoring occasions overlapped in time with the most or least repetitions if the at least two of the downlink transmissions and monitoring occasions overlapped in time have the same downlink priority level.

6. A wireless node, comprising:
memory comprising computer-executable instructions; and
a processing system configured to execute the computer-executable instructions and cause the wireless node to:
receive signaling indicating downlink priority levels for downlink transmissions and monitoring occasions;
determine, based on one or more rules, a reception assumption to use when at least two of the downlink transmissions and monitoring occasions overlap in time; and
process the at least two of the downlink transmissions and monitoring occasions that overlapped in time based on the reception assumption,
(i) wherein the at least two of the downlink transmissions and monitoring occasions overlapped in time comprise physical downlink shared channel (PDSCH) transmissions with different reception assumptions and different downlink priority levels, including a retransmission of a first PDSCH that was previously successfully decoded and a transmission of a second PDSCH that was not previously successfully decoded, and wherein the processing system is configured to execute computer-executable instructions and cause the wireless node to determine to use a reception assumption of the second PDSCH even if the downlink priority level of the first PDSCH is higher than the downlink priority level of the second PDSCH; or
(ii) wherein the at least two of the downlink transmissions and monitoring occasions overlapped in time comprise at least one channel state information reference signal (CSI-RS) without repetition that overlaps with at least one of a physical downlink control channel (PDCCH) monitoring occasion or physical downlink shared channel (PDSCH) transmission, wherein the at least one CSI-RS and the at least one of the PDCCH monitoring occasion or PDSCH transmission have different reception assumptions and different downlink priority levels, and wherein the processing system is configured to execute computer-executable instructions and cause the wireless node to determine to use a reception assumption of whichever of the at least one CSI-RS or the at least one of the PDCCH monitoring occasion or PDSCH transmission has a highest downlink priority level; or
(iii) wherein the at least two of the downlink transmissions and monitoring occasions overlapped in time comprise two or more downlink transmissions and monitoring occasions that overlap in time and are scheduled by or associated with a first control resource set (CORESET) pool index, and two or more other downlink transmissions and monitoring occasions that overlap in time and are scheduled by or associated with a second CORESET pool index, and wherein the processing system is configured to execute computer-executable instructions and cause the wireless node to apply the one or more rules to determine a reception assumption to use to process at least the two or more downlink transmissions and monitoring occasions that overlap in time and are scheduled by or associated with the first control resource set (CORESET) pool index, or the two or more other downlink transmissions and monitoring occasions that overlap in time and are scheduled by or associated with the second CORESET pool index.

7. The wireless node of claim 6, wherein the at least two of the downlink transmissions and monitoring occasions overlapped in time comprise the physical downlink shared channel (PDSCH) transmissions with the different reception assumptions and the different downlink priority levels, including the retransmission of the first PDSCH that was previously successfully decoded and the transmission of the second PDSCH that was not previously successfully decoded, and wherein the processing system is configured to execute computer-executable instructions and cause the wireless node to determine to use the reception assumption of the second PDSCH even if the downlink priority level of the first PDSCH is higher than the downlink priority level of the second PDSCH.

8. The wireless node of claim 6, wherein the at least two of the downlink transmissions and monitoring occasions overlapped in time comprise the at least one channel state information reference signal (CSI-RS) without repetition that overlaps with the at least one of the PDCCH monitoring occasion or PDSCH transmission, wherein the at least one CSI-RS and the at least one of the PDCCH monitoring occasion or PDSCH transmission have the different reception assumptions and the different downlink priority levels, and wherein the processing system is configured to execute computer-executable instructions and cause the wireless node to determine to use the reception assumption of whichever of the at least one CSI-RS and the at least one of the PDCCH monitoring occasion or PDSCH transmission has the highest downlink priority level.

9. The wireless node of claim 6, wherein the at least two of the downlink transmissions and monitoring occasions overlapped in time comprise the two or more downlink transmissions and monitoring occasions that overlap in time and are scheduled by or associated with the first control resource set (CORESET) pool index, and the two or more other downlink transmissions and monitoring occasions that overlap in time and are scheduled by or associated with the second CORESET pool index, and wherein the processing system is configured to execute computer-executable instructions and cause the wireless node to apply the one or more rules to determine the reception assumption to use to process at least the two or more downlink transmissions and monitoring occasions that overlap in time and are scheduled by or associated with the first control resource set (CORESET) pool index, or the two or more other downlink transmissions and monitoring occasions that overlap in time and are scheduled by or associated with the second CORESET pool index.

* * * * *